United States Patent
Shah et al.

(10) Patent No.: US 10,698,992 B2
(45) Date of Patent: Jun. 30, 2020

(54) PREVENTING UNAUTHORIZED ACCESS TO SECURE INFORMATION SYSTEMS USING ADVANCED BIOMETRIC AUTHENTICATION TECHNIQUES

(71) Applicant: Bank of America Corporation, Charlotte, NC (US)

(72) Inventors: Hitesh Shah, Seattle, WA (US); Michael Toth, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 222 days.

(21) Appl. No.: 15/898,827

(22) Filed: Feb. 19, 2018

(65) Prior Publication Data
US 2019/0258786 A1    Aug. 22, 2019

(51) Int. Cl.
| | |
|---|---|
| H04L 29/00 | (2006.01) |
| G06F 21/32 | (2013.01) |
| G06Q 20/36 | (2012.01) |
| H04L 29/06 | (2006.01) |
| G06Q 20/10 | (2012.01) |

(52) U.S. Cl.
CPC .......... *G06F 21/32* (2013.01); *G06Q 20/108* (2013.01); *G06Q 20/3674* (2013.01); *H04L 63/0861* (2013.01)

(58) Field of Classification Search
CPC ...... G06F 1/163; G06F 19/3481; G06F 3/011; G06F 3/017; G06F 3/016; G06F 21/35; G06F 3/014; G06F 3/038
See application file for complete search history.

(56) References Cited

U.S. PATENT DOCUMENTS

| | | | |
|---|---|---|---|
| 2012/0197797 A1* | 8/2012 | Grigg | G06Q 20/1085 705/43 |
| 2018/0034224 A1 | 2/2018 | Chung et al. | |
| 2018/0034642 A1 | 2/2018 | Kaehler | |
| 2018/0034796 A1* | 2/2018 | Ross | H04L 63/08 |
| 2018/0034850 A1 | 2/2018 | Turgeman | |
| 2018/0034912 A1 | 2/2018 | Binder et al. | |
| 2018/0034936 A1 | 2/2018 | Correia e Costa et al. | |
| 2018/0034954 A1 | 2/2018 | Yang et al. | |

(Continued)

*Primary Examiner* — Ghazal B Shehni
(74) *Attorney, Agent, or Firm* — Banner & Witcoff, Ltd.; Michael A. Springs

(57) ABSTRACT

Aspects of the disclosure relate to preventing unauthorized access to secured information systems using advanced biometric authentication techniques. A computing device may receive input requesting to login to a user account associated with a mobile banking application installed on the computing device. The computing device may send, to a client authentication computing platform, a first authentication request and receive, from the client authentication computing platform, one or more authentication prompt commands. The computing device then may present one or more authentication prompts and collect, from one or more linked wearable devices, one or more advanced biometrics. After validating the one or more advanced biometrics, the computing device may send, to the client authentication computing platform, authentication response data. Thereafter, the computing device may receive mobile banking user interface information and present one or more mobile banking user interfaces.

20 Claims, 17 Drawing Sheets

(56) References Cited

U.S. PATENT DOCUMENTS

| | | |
|---|---|---|
| 2018/0035044 A1 | 2/2018 | Lee et al. |
| 2018/0035075 A1 | 2/2018 | Lee et al. |
| 2018/0035204 A1 | 2/2018 | Park et al. |
| 2018/0035249 A1 | 2/2018 | Lam et al. |
| 2018/0035293 A1 | 2/2018 | Elnekaveh et al. |
| 2018/0035297 A1 | 2/2018 | Cronin |
| 2018/0035384 A1 | 2/2018 | Kim et al. |
| 2018/0035391 A1 | 2/2018 | Neves et al. |
| 2018/0035901 A1 | 2/2018 | Cronin et al. |
| 2018/0035927 A1 | 2/2018 | Cronin et al. |
| 2018/0035943 A1 | 2/2018 | Shemesh et al. |
| 2018/0039368 A1 | 2/2018 | Choi et al. |
| 2018/0039372 A1 | 2/2018 | Cho et al. |
| 2018/0039392 A1 | 2/2018 | Kim et al. |
| 2018/0039410 A1 | 2/2018 | Kim et al. |
| 2018/0039737 A1 | 2/2018 | Dempers et al. |
| 2018/0039768 A1 | 2/2018 | Roberts et al. |
| 2018/0039769 A1 | 2/2018 | Saunders et al. |
| 2018/0039786 A1 | 2/2018 | Naqvi et al. |
| 2018/0039791 A1 | 2/2018 | Beye et al. |
| 2018/0039815 A1 | 2/2018 | Jung et al. |
| 2018/0039817 A1 | 2/2018 | Romera Jolliff et al. |
| 2018/0039924 A1 | 2/2018 | Beye et al. |
| 2018/0039952 A1 | 2/2018 | Dintenfass et al. |
| 2018/0039989 A1 | 2/2018 | Beye et al. |
| 2018/0039990 A1 | 2/2018 | Lindemann |
| 2018/0040062 A1 | 2/2018 | Dintenfass et al. |
| 2018/0040093 A1 | 2/2018 | Boesen |
| 2018/0040182 A1 | 2/2018 | Malhotra |
| 2018/0040301 A1 | 2/2018 | Bae et al. |
| 2018/0040323 A1 | 2/2018 | Lesso et al. |
| 2018/0040325 A1 | 2/2018 | Melanson et al. |
| 2018/0040950 A1 | 2/2018 | Lee et al. |
| 2018/0041349 A1 | 2/2018 | Jung et al. |
| 2018/0041448 A1 | 2/2018 | Boss et al. |
| 2018/0041487 A1 | 2/2018 | Wang |
| 2018/0041503 A1 | 2/2018 | Lindemann |
| 2018/0041511 A1 | 2/2018 | Zhu et al. |
| 2018/0041624 A1 | 2/2018 | Park et al. |
| 2018/0041814 A1 | 2/2018 | Christie et al. |
| 2018/0041834 A1 | 2/2018 | Kum et al. |
| 2018/0041881 A1 | 2/2018 | Todasco |
| 2018/0042127 A1 | 2/2018 | Kim et al. |

\* cited by examiner

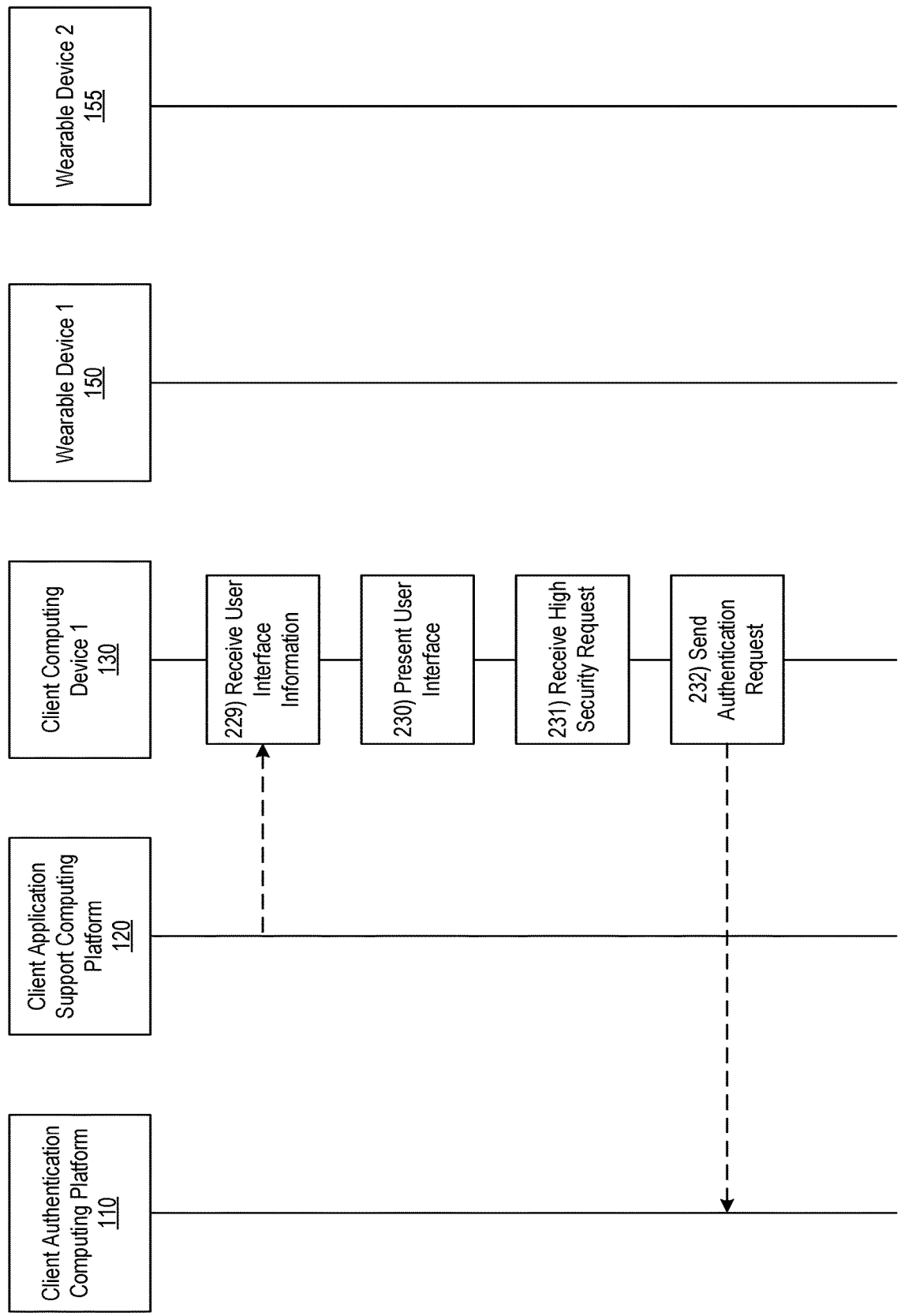

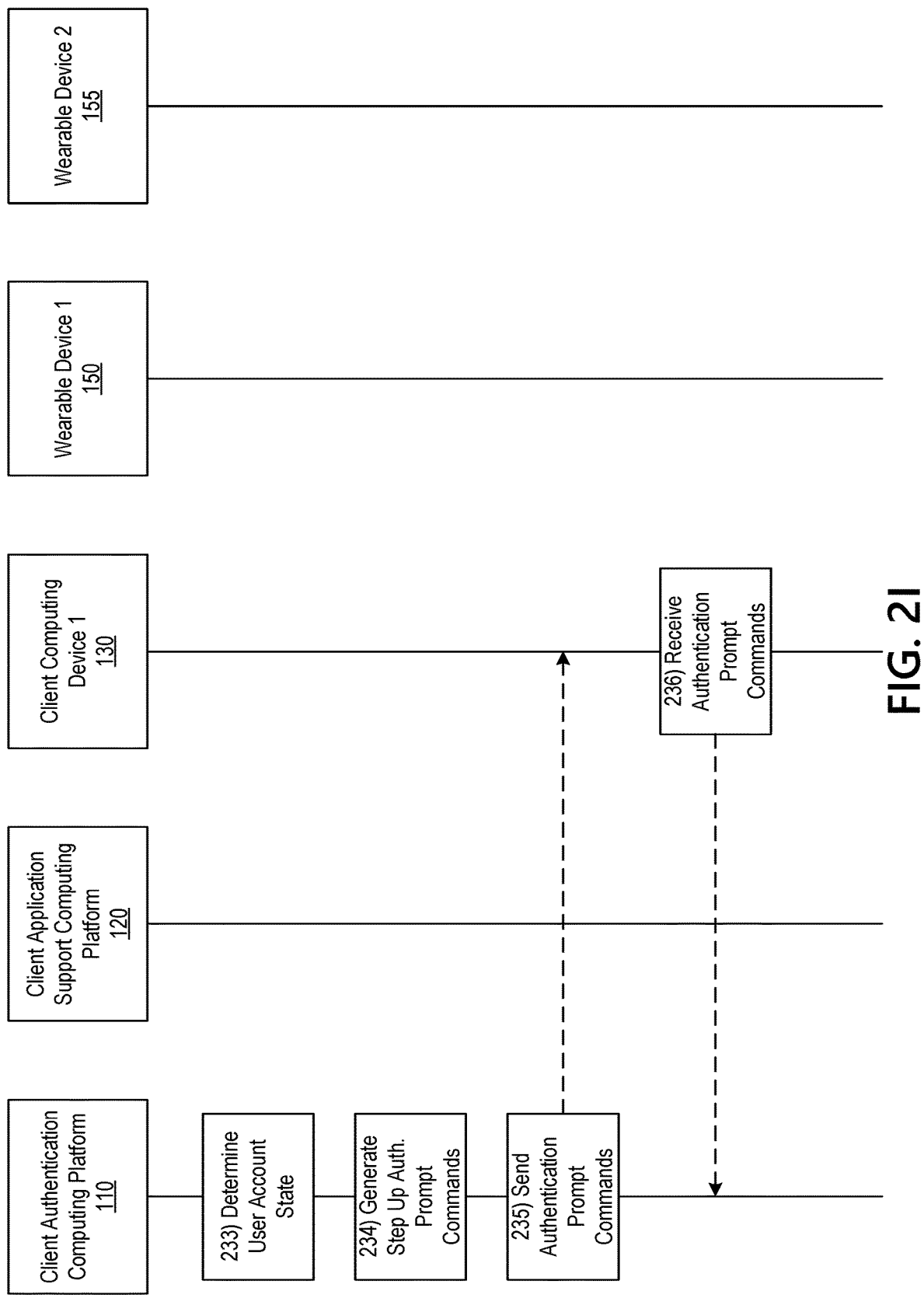

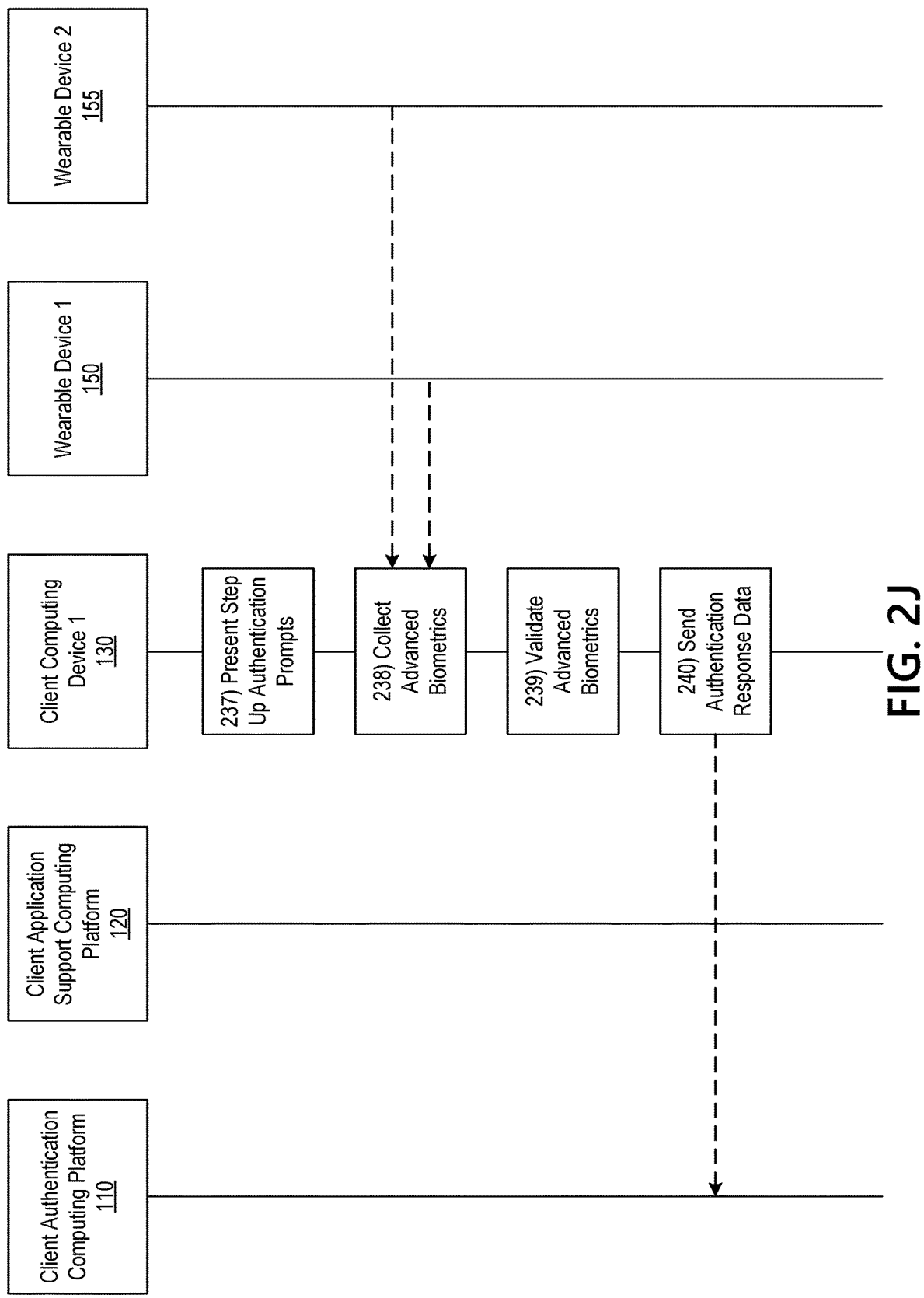

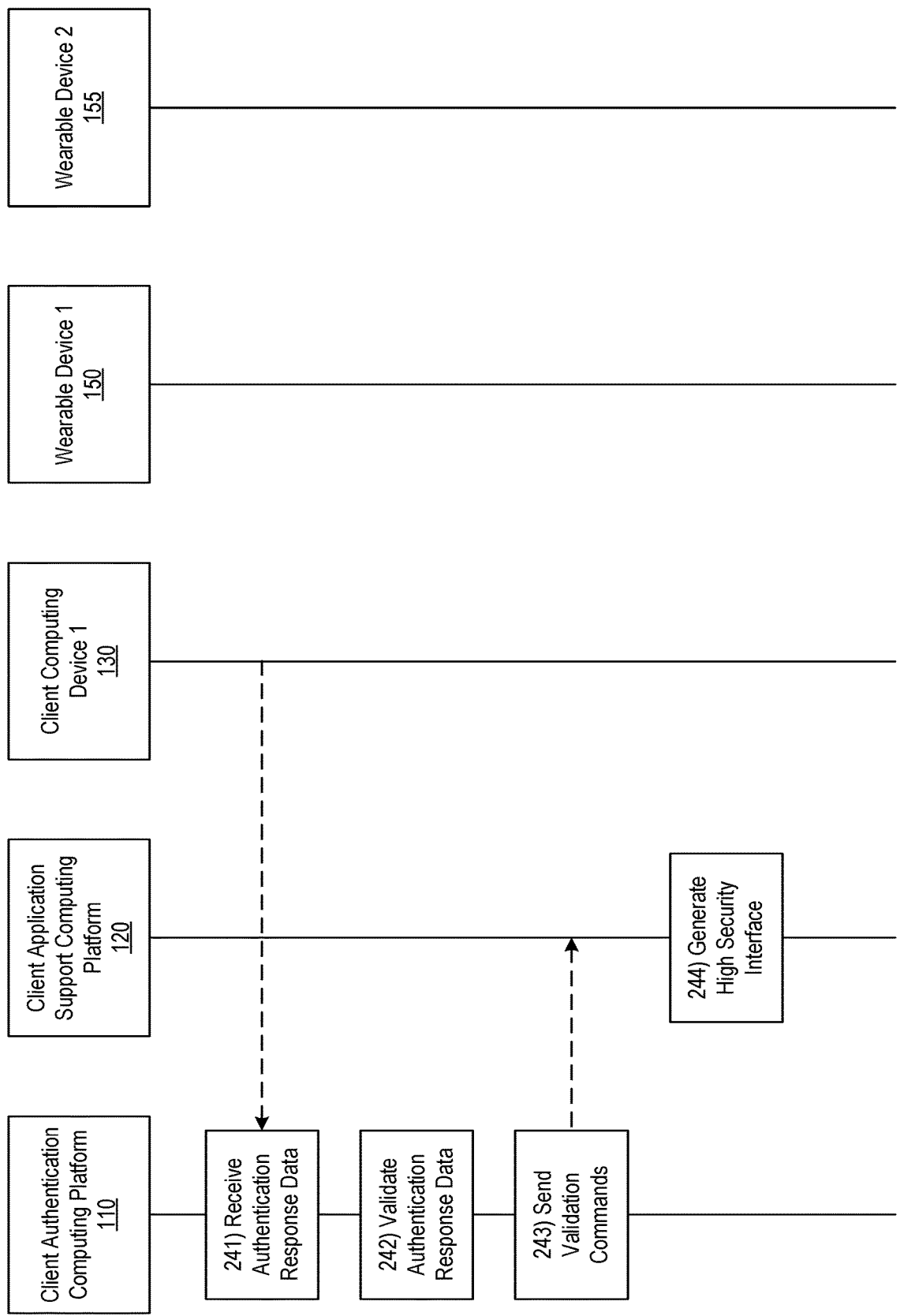

PREVENTING UNAUTHORIZED ACCESS TO SECURE INFORMATION SYSTEMS USING ADVANCED BIOMETRIC AUTHENTICATION TECHNIQUES

BACKGROUND

Aspects of the disclosure relate to providing information security and preventing unauthorized access to resources of an information system. In particular, one or more aspects of the disclosure relate to preventing unauthorized access to secured information systems using advanced biometric authentication techniques.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by implementing advanced biometric authentication techniques.

In accordance with one or more embodiments, a computing device having at least one processor, a communication interface, and memory may receive input requesting to login to a user account associated with a mobile banking application installed on the computing device. Based on receiving the input requesting to login to the user account associated with the mobile banking application installed on the computing device, the computing device may send, via the communication interface, to a client authentication computing platform, a first authentication request. The computing device may receive, via the communication interface, from the client authentication computing platform, one or more authentication prompt commands. The computing device then may present one or more authentication prompts based on the one or more authentication prompt commands received from the client authentication computing platform. Subsequently, the computing device may collect, from one or more linked wearable devices, one or more advanced biometrics based on the one or more authentication prompt commands received from the client authentication computing platform. The computing device may validate the one or more advanced biometrics collected from the one or more linked wearable devices based on one or more baseline data patterns. Based on validating the one or more advanced biometrics collected from the one or more linked wearable devices based on the one or more baseline data patterns, the computing device may send, via the communication interface, to the client authentication computing platform, authentication response data. In addition, sending the authentication response data to the client authentication computing platform may cause the client authentication computing platform to: validate the authentication response data; and based on validating the authentication response data, connect the computing device to a client application support computing platform configured to generate content for the mobile banking application installed on the computing device. After sending the authentication response data to the client authentication computing platform, the computing device may receive, from the client application support computing platform, mobile banking user interface information. The computing device then may present, using the mobile banking application installed on the computing device, one or more mobile banking user interfaces based on the mobile banking user interface information received from the client application support computing platform.

In some embodiments, prior to receiving the input requesting to login to the user account associated with the mobile banking application installed on the computing device, the computing device may receive, via the communication interface, from the client authentication computing platform, the mobile banking application. In addition, the mobile banking application received from the client authentication computing platform may be configured by the client authentication computing platform for the computing device.

In some embodiments, based on receiving the mobile banking application from the client authentication computing platform, the computing device may launch the mobile banking application. Based on launching the mobile banking application, the computing device may present a device pairing user interface.

In some embodiments, the computing device may establish a first wireless data connection to a first wearable device of the one or more linked wearable devices to link the first wearable device to the computing device. In addition, the computing device may establish a second wireless data connection to a second wearable device of the one or more linked wearable devices to link the second wearable device to the computing device. While the first wireless data connection is established, the computing device may receive first biometric data from the first wearable device via the first wireless data connection. And while the second wireless data connection is established, the computing device may receive second biometric data from the second wearable device via the second wireless data connection.

In some embodiments, the computing device may generate a first baseline data pattern of the one or more baseline data patterns based on the first biometric data received from the first wearable device via the first wireless data connection. In addition, the computing device may generate a second baseline data pattern of the one or more baseline data patterns based on the second biometric data received from the second wearable device via the second wireless data connection. Then, the computing device may store the first baseline data pattern of the one or more baseline data patterns for validating biometric data received from the first wearable device. And the computing device may store the second baseline data pattern of the one or more baseline data patterns for validating biometric data received from the second wearable device.

In some embodiments, sending the first authentication request to the client authentication computing platform may cause the client authentication computing platform to: determine user account state information corresponding to the user account associated with the mobile banking application installed on the computing device; generate the one or more authentication prompt commands based on the user account state information corresponding to the user account associated with the mobile banking application installed on the computing device; and send the one or more authentication prompt commands to the computing device.

In some embodiments, the computing device may receive input requesting a high-security transaction involving the user account associated with the mobile banking application installed on the computing device. Based on receiving the input requesting the high-security transaction involving the user account associated with the mobile banking application installed on the computing device, the computing device may send, via the communication interface, to the client authentication computing platform, a second authentication request.

In some embodiments, after sending the second authentication request to the client authentication computing platform, the computing device may receive, via the communication interface, from the client authentication computing platform, one or more step-up authentication prompt commands. Subsequently, the computing device may present one or more step-up authentication prompts based on the one or more step-up authentication prompt commands received from the client authentication computing platform. Then, the computing device may collect, from the one or more linked wearable devices, one or more additional advanced biometrics based on the one or more step-up authentication prompt commands received from the client authentication computing platform. Thereafter, the computing device may validate the one or more additional advanced biometrics collected from the one or more linked wearable devices based on the one or more baseline data patterns. Based on validating the one or more additional advanced biometrics collected from the one or more linked wearable devices based on the one or more baseline data patterns, the computing device may send, via the communication interface, to the client authentication computing platform, step-up authentication response data.

In some embodiments, sending the step-up authentication response data to the client authentication computing platform may cause the client authentication computing platform to: validate the step-up authentication response data; and based on validating the step-up authentication response data, send one or more validation commands to the client application support computing platform to trigger the client application support computing platform to generate high-security content for the mobile banking application installed on the computing device.

In some embodiments, the computing device may receive, from the client application support computing platform, high-security mobile banking user interface information. Subsequently, the computing device may present, using the mobile banking application installed on the computing device, one or more high-security mobile banking user interfaces based on the high-security mobile banking user interface information received from the client application support computing platform.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2L depict an illustrative event sequence for preventing unauthorized access to secured information systems using advanced biometric authentication techniques in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
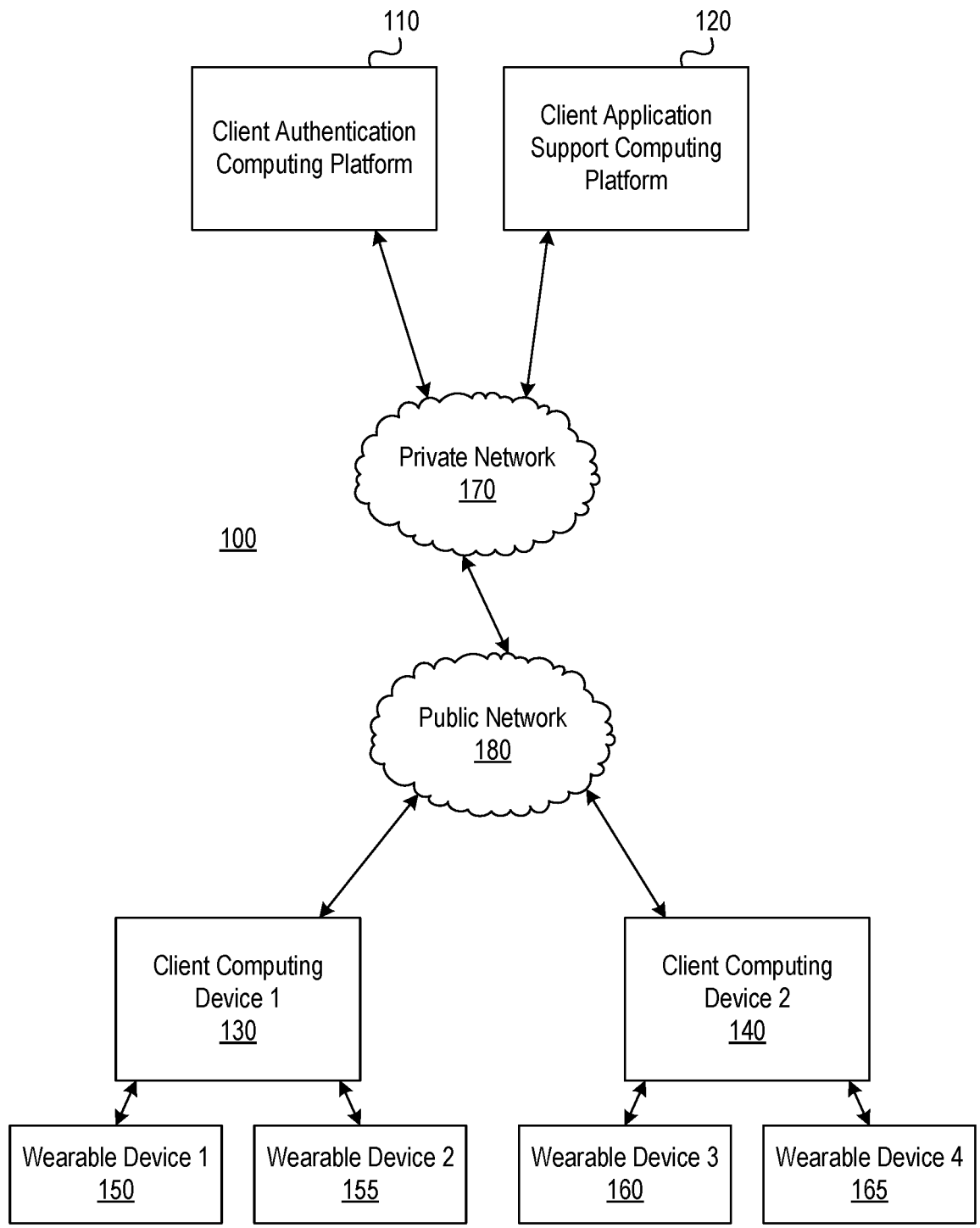
FIGS. 1A and 1B depict an illustrative computing environment for preventing unauthorized access to secured information systems using advanced biometric authentication techniques in accordance with one or more example embodiments.
Figure 1B:
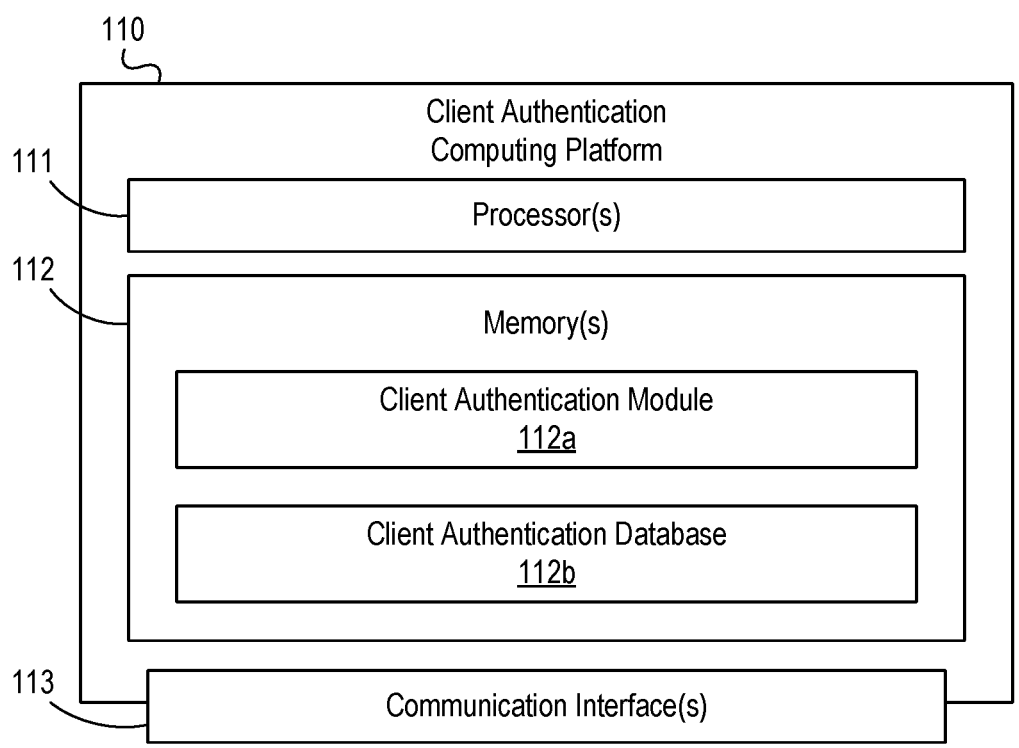

FIGS. 1A and 1B depict an illustrative computing environment for preventing unauthorized access to secured information systems using advanced biometric authentication techniques in accordance with one or more example embodiments. Referring to FIG. 1A, computing environment 100 may include one or more computer systems. For example, computing environment 100 may include a client authentication computing platform 110, a client application support computing platform 120, a first client computing device 130, a second client computing device 140, a first wearable device 150, a second wearable device 155, a third wearable device 160, and a fourth wearable device 165.

As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Client application support computing platform 120 may include one or more computing devices and/or other computer components (e.g., processors, memories, communication interfaces). In addition, and as illustrated in greater detail below, client application support computing platform 120 may be configured to generate user interface information (which may, e.g., include user interface templates, user interface elements, user interface content, and/or other data) to cause one or more other computer systems to display and/or otherwise present one or more user interfaces. In some instances, the user interfaces and/or corresponding user interface information generated by client application support computing platform 120 may be associated with a client portal provided by an organization, such as an online banking portal or a mobile banking portal provided by a financial institution. Such a portal may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Client computing device 130 may be a personal computing device (e.g., desktop computer, laptop computer) or mobile computing device (e.g., smartphone, tablet) that may be linked to and/or used by a first user (who may, e.g., be a client of an organization operating client authentication computing platform 110 and/or client application support computing platform 120). Wearable device 150 may be a wearable computing device (e.g., smart watch, fitness tracker, electronic necklace, electronic ring, heart rate monitor, walking gait sensor, blood pressure monitor) that may be linked to and/or used by the first user of client computing device 130. Wearable device 155 may be another wearable computing device (e.g., smart watch, fitness tracker, electronic necklace, electronic ring, heart rate monitor, walking gait sensor, blood pressure monitor) that may be linked to and/or used by the first user of client computing device 130.

Client computing device 140 may be a personal computing device (e.g., desktop computer, laptop computer) or mobile computing device (e.g., smartphone, tablet) that may be linked to and/or used by a second user (who may, e.g., be a client of an organization operating client authentication computing platform 110 and/or client application support computing platform 120). Wearable device 160 may be a wearable computing device (e.g., smart watch, fitness tracker, electronic necklace, electronic ring, heart rate monitor, walking gait sensor, blood pressure monitor) that may be linked to and/or used by the second user of client computing device 140. Wearable device 165 may be another wearable computing device (e.g., smart watch, fitness tracker, electronic necklace, electronic ring, heart rate monitor, walking gait sensor, blood pressure monitor) that may be linked to and/or used by the second user of client computing device 140.

Computing environment 100 also may include one or more networks, which may interconnect one or more of client authentication computing platform 110, client application support computing platform 120, client computing device 130, client computing device 140, wearable device 150, wearable device 155, wearable device 160, and wearable device 165. For example, computing environment 100 may include a private network 170 (which may, e.g., interconnect client authentication computing platform 110, client application support computing platform 120, and/or one or more other systems associated with an organization operating client authentication computing platform 110 and client application support computing platform 120) and public network 180 (which may, e.g., interconnect client computing device 130, client computing device 140, and/or one or more other systems, public networks, sub-networks, and/or the like).

In one or more arrangements, client computing device 130, client computing device 140, and/or the other systems included in computing environment 100 may be any type of computing device capable of receiving a user interface, receiving input via the user interface, and communicating the received input to one or more other computing devices. For example, client computing device 130, client computing device 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client authentication computing platform 110, client application support computing platform 120, client computing device 130, client computing device 140, wearable device 150, wearable device 155, wearable device 160, and wearable device 165 may, in some instances, be special-purpose computing devices configured to perform specific functions.

Referring to FIG. 1B, client authentication computing platform 110 may include one or more processors 111, memory 112, and communication interface 113. A data bus may interconnect processor 111, memory 112, and communication interface 113. Communication interface 113 may be a network interface configured to support communication between client authentication computing platform 110 and one or more networks (e.g., network 170, network 180, or the like). Memory 112 may include one or more program modules having instructions that when executed by processor 111 cause client authentication computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 112a and a client authentication database 112b. Client authentication module 112a may have instructions that direct and/or cause client authentication computing platform 110 to control access to resources of an information system by implementing advanced biometric authentication techniques, as discussed in greater detail below. Client authentication database 112b may store information used by client authentication module 112a and/or client authentication computing platform 110 in controlling access to resources of an information system by implementing advanced biometric authentication techniques and/or in performing other functions.

Figure 2A:
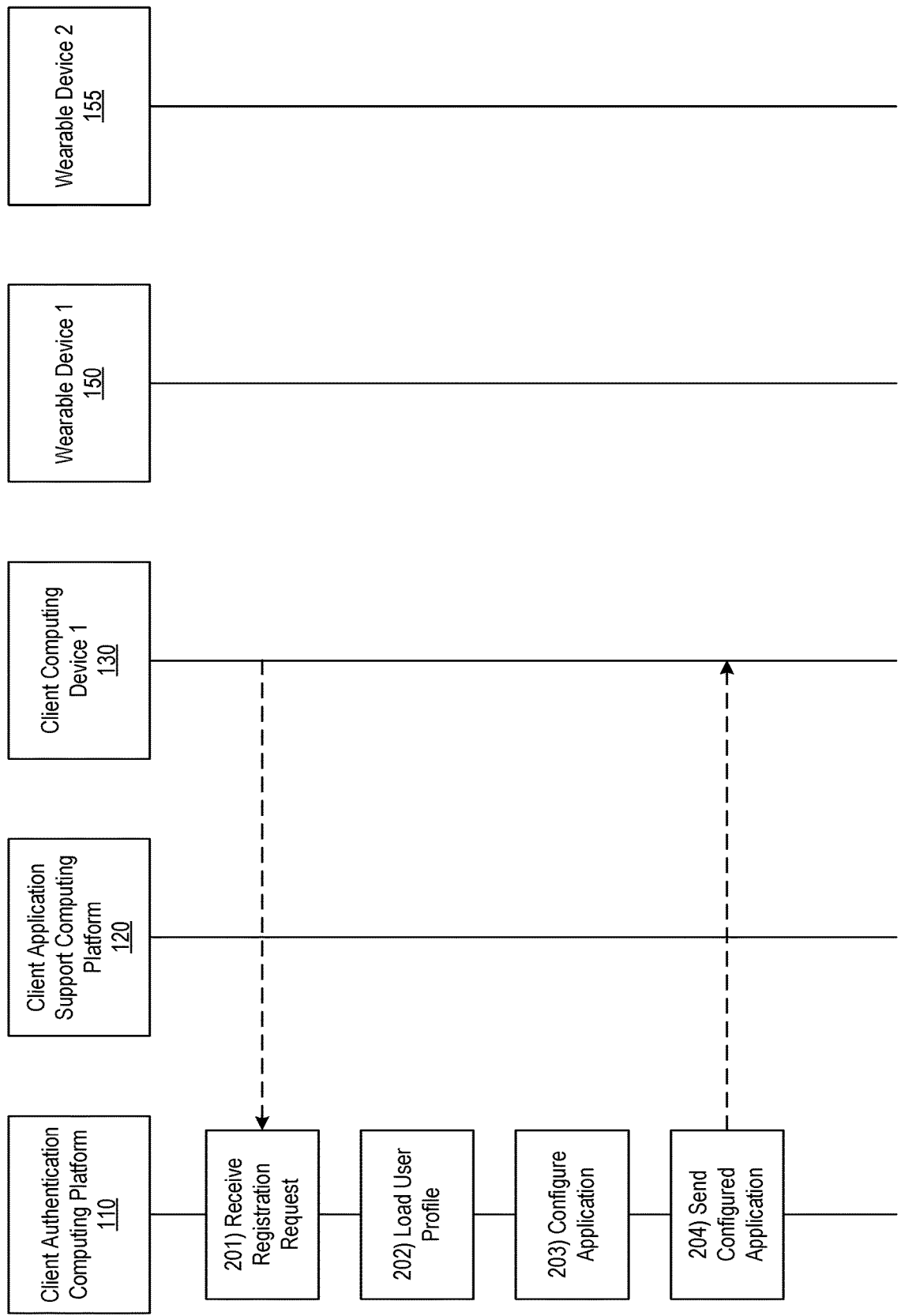

FIGS. 2A-2L depict an illustrative event sequence for preventing unauthorized access to secured information systems using advanced biometric authentication techniques in accordance with one or more example embodiments. Referring to FIG. 2A, at step 201, client authentication computing platform 110 may receive a registration request from client computing device 130. At step 202, client authentication computing platform 110 may load a user profile linked to client computing device 130 and/or generate such a user profile if one does not already exist. In generating such a user profile, client authentication computing platform 110 may, for instance, store and/or update a device identifier for client computing device 130 and/or other information associated with client computing device 130. At step 203, client authentication computing platform 110 may configure a copy of a mobile banking application for client computing device 130 based on the registration request received from client computing device 130. At step 204, client authentication computing platform 110 may send the configured mobile banking application to client computing device 130.

Figure 2B:
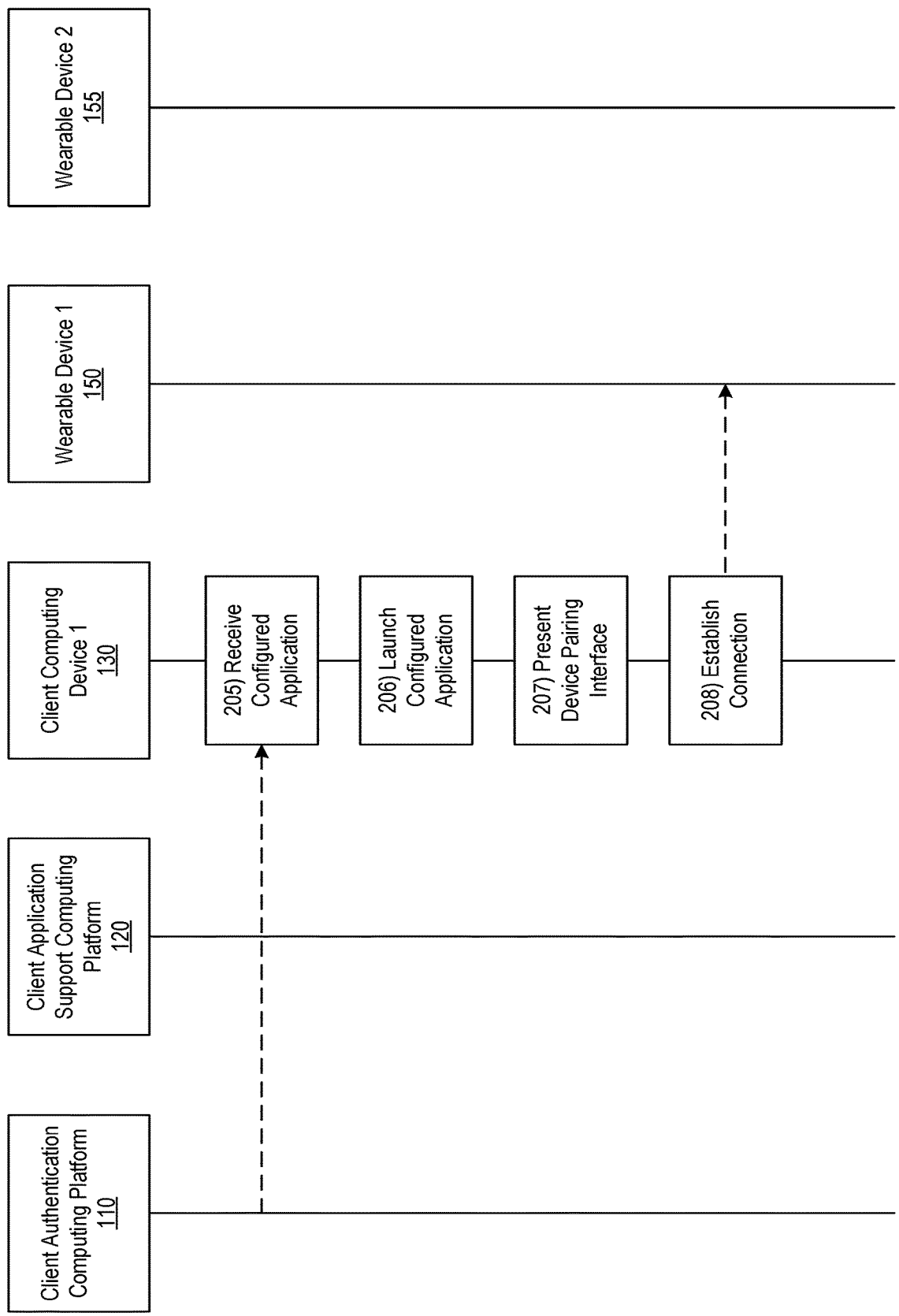

Referring to FIG. 2B, at step 205, client computing device 130 may receive the configured mobile banking application from client authentication computing platform 110. For example, prior to receiving input requesting to login to a user account associated with the mobile banking application (which may, e.g., be installed on the computing device, e.g., client computing device 130), client computing device 130 may receive, via a communication interface (which may, e.g., be a network interface configured to support communication between client computing device 130 and one or more networks (e.g., network 170, network 180, or the like)), from the client authentication computing platform (e.g., client authentication computing platform 110), the mobile banking application. In addition, the mobile banking application received from the client authentication computing platform (e.g., client authentication computing platform 110) may be configured (e.g., at step 203) by the client authentication computing platform (e.g., client authentication computing platform 110) for the computing device (e.g., client computing device 130).

Figure 3:
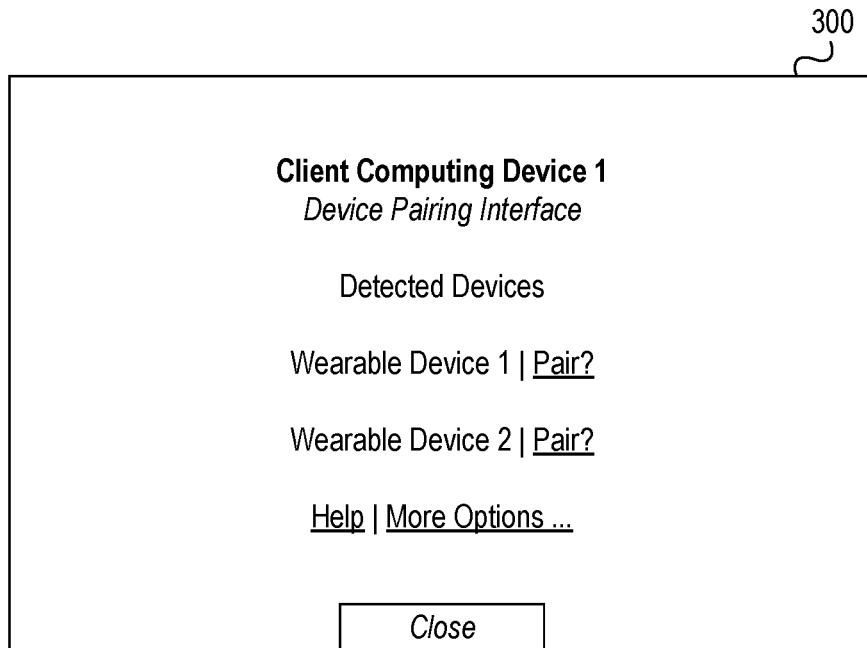
FIGS. 3, 4, 5, and 6 depict example graphical user interfaces for preventing unauthorized access to secured information systems using advanced biometric authentication techniques in accordance with one or more example embodiments.

At step 206, client computing device 130 may launch the configured mobile banking application. For example, at step 206, based on receiving the mobile banking application from the client authentication computing platform (e.g., client authentication computing platform 110), client computing device 130 may launch the mobile banking application. At step 207, client computing device 130 may present a device pairing interface. For example, at step 207, based on launching the mobile banking application, client computing device 130 present a device pairing user interface. In some instances, such a device pairing interface may be presented by client computing device 130 via an operating system menu, while in other instances, such a device pairing interface may be presented by client computing device 130 via a mobile banking application menu. In some instances, in presenting the device pairing user interface, client computing device 130 may display and/or otherwise present a graphical user interface similar to graphical user interface 300, which is illustrated in FIG. 3. As seen in FIG. 3, graphical user interface 300 may include a list of wearable devices detected by client computing device 130 (e.g., via one or more wireless communication interfaces of client computing device 130, such as via a Bluetooth interface of client computing device 130), one or more controls enabling a user of client computing device 130 to pair the wearable devices detected by client computing device 130 with client computing device 130, and/or other user-selectable options and/or content.

At step 208, client computing device 130 may establish a connection to wearable device 150. For example, at step 208, client computing device 130 may establish a first wireless data connection to a first wearable device (e.g., wearable device 150) of one or more linked wearable devices (e.g., wearable device 150, wearable device 155) to link the first wearable device (e.g., wearable device 150) to the computing device (e.g., client computing device 130).

Figure 2C:
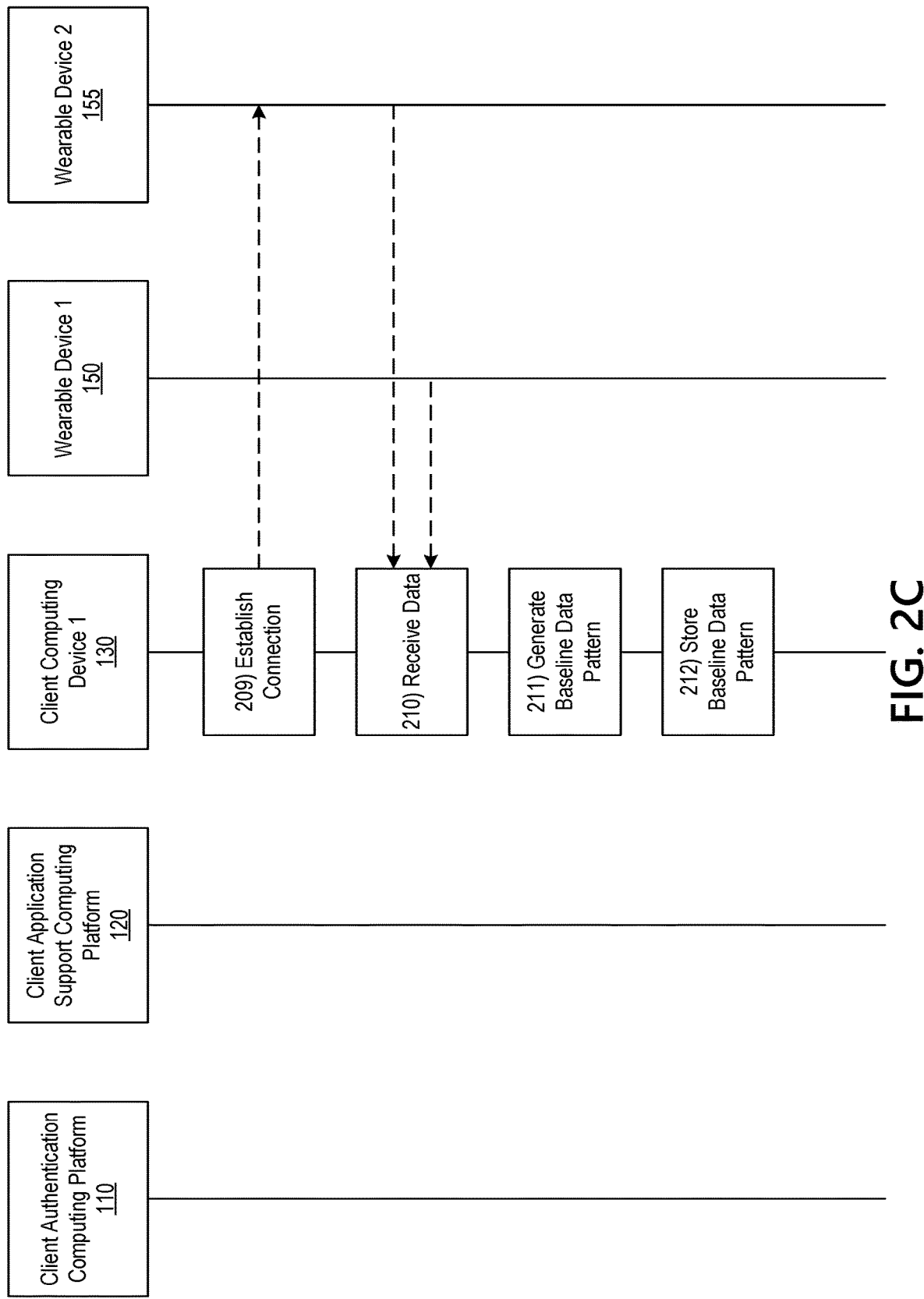

Referring to FIG. 2C, at step 209, client computing device 130 may establish a connection to wearable device 155. For example, at step 209, client computing device 130 may establish a second wireless data connection to a second wearable device (e.g., wearable device 155) of the one or more linked wearable devices (e.g., wearable device 150, wearable device 155) to link the second wearable device (e.g., wearable device 155) to the computing device (e.g., client computing device 130). At step 210, client computing device 130 may receive data from wearable device 150 and wearable device 155, and such data may include biometric data captured and/or otherwise monitored by wearable device 150 and wearable device 155 in connection with a user of wearable device 150 and wearable device 155 (who, e.g., may be wearing wearable device 150 and wearable device 155 and also using client computing device 130). For example, at step 210, while the first wireless data connection is established, client computing device 130 may receive first biometric data from the first wearable device (e.g., wearable device 150) via the first wireless data connection. And while the second wireless data connection is established, client computing device 130 may receive second biometric data from the second wearable device (e.g., wearable device 155) via the second wireless data connection.

At step 211, client computing device 130 may generate one or more baseline data patterns based on the data received from wearable device 150 and wearable device 155 and/or based on other data captured by client computing device 130 (e.g., using biometric sensors and/or other sensors included in and/or coupled to client computing device 130). For example, at step 211, client computing device 130 may generate a first baseline data pattern of one or more baseline data patterns based on the first biometric data received from the first wearable device (e.g., wearable device 150) via the first wireless data connection. And client computing device 130 may generate a second baseline data pattern of the one or more baseline data patterns based on the second biometric data received from the second wearable device (e.g., wearable device 155) via the second wireless data connection.

At step 212, client computing device 130 may store the one or more generated baseline data patterns. For example, at step 212, client computing device 130 may store the first baseline data pattern of the one or more baseline data patterns (e.g., for validating biometric data later received by client computing device 130 from the first wearable device, e.g., wearable device 150). And client computing device 130 may store the second baseline data pattern of the one or more baseline data patterns (e.g., for validating biometric data later received by client computing device 130 from the second wearable device, e.g., wearable device 155).

Figure 2D:
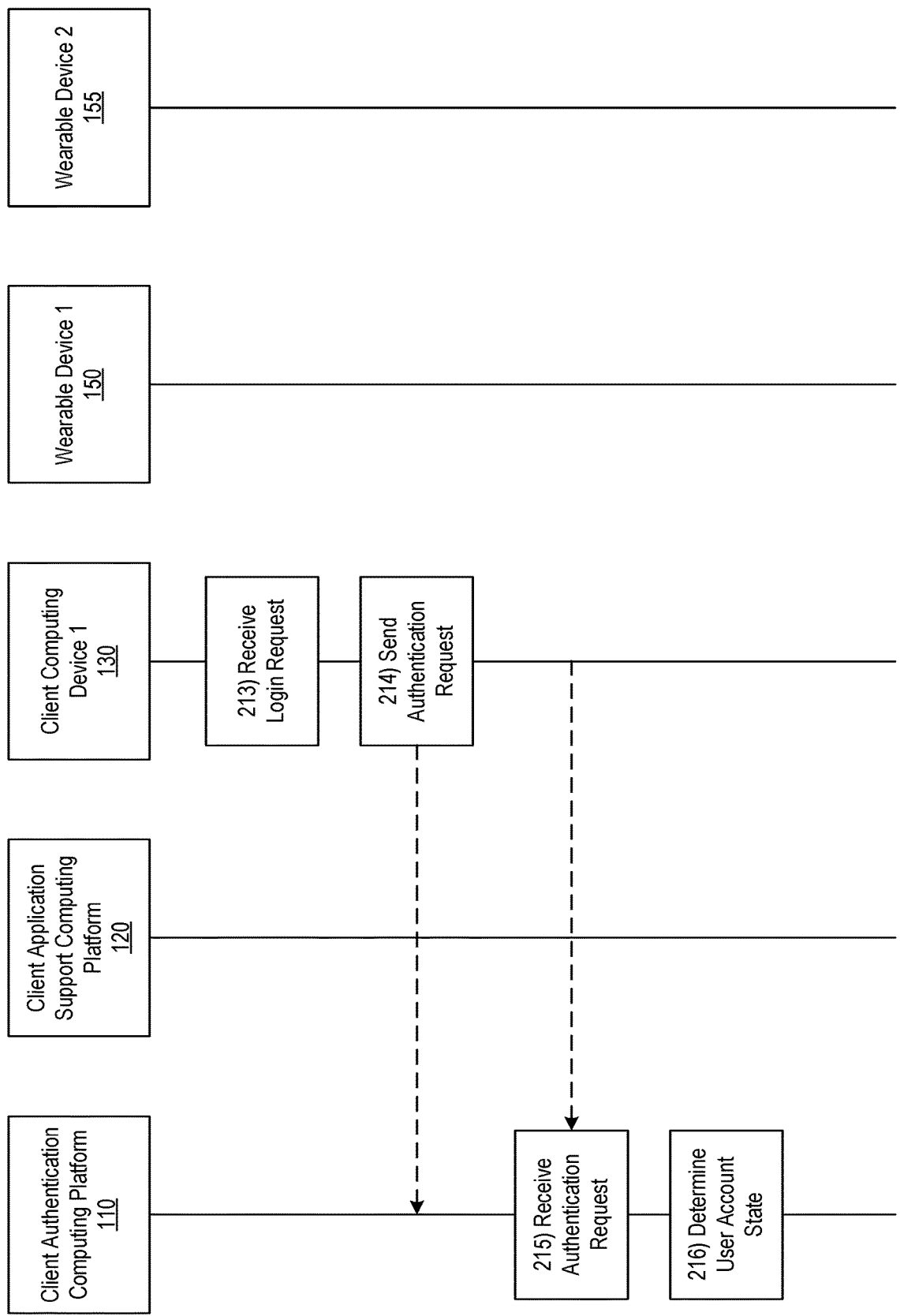

Referring to FIG. 2D, at step 213, client computing device 130 may receive a login request (e.g., as user input received via the mobile banking application). For example, at step 213, client computing device 130 may receive input requesting to login to a user account associated with a mobile banking application installed on the computing device (e.g., client computing device 130).

At step 214, client computing device 130 may send an authentication request to client authentication computing platform 110, and the authentication request may include a device identifier corresponding to client computing device 130 and/or other data associated with client computing device 130. For example at step 214, based on receiving the input requesting to login to the user account associated with the mobile banking application installed on the computing device (e.g., client computing device 130), client computing device 130 may send, via the communication interface, to a client authentication computing platform (e.g., client authentication computing platform 110), a first authentication request.

In some embodiments, sending the first authentication request to the client authentication computing platform may cause the client authentication computing platform to: determine user account state information corresponding to the user account associated with the mobile banking application installed on the computing device; generate one or more authentication prompt commands based on the user account state information corresponding to the user account associated with the mobile banking application installed on the computing device; and send the one or more authentication prompt commands to the computing device. For example, in sending the first authentication request to the client authentication computing platform (e.g., client authentication computing platform 110), client computing device 130 may cause the client authentication computing platform (e.g., client authentication computing platform 110) to determine user account state information corresponding to the user account associated with the mobile banking application installed on the computing device (e.g., client computing device 130). In addition, client computing device 130 may cause client authentication computing platform 110 to generate one or more authentication prompt commands based on the user account state information corresponding to the user account associated with the mobile banking application installed on the computing device (e.g., client computing device 130). In addition, client computing device 130 may cause client authentication computing platform 110 to send the one or more authentication prompt commands to the computing device (e.g., client computing device 130), as illustrated in greater detail below.

At step 215, client authentication computing platform 110 may receive the authentication request from client computing device 130. At step 216, client authentication computing platform 110 may determine user account state information corresponding to the user account associated with the mobile banking application installed on the computing device (e.g., client computing device 130). For example, client authentication computing platform 110 may determine a security state of the user account associated with the mobile banking application installed on the computing device (e.g., client computing device 130) based on multi-channel authentication state information corresponding the user account and/or one or more authentication rules maintained by client authentication computing platform 110.

Figure 2E:
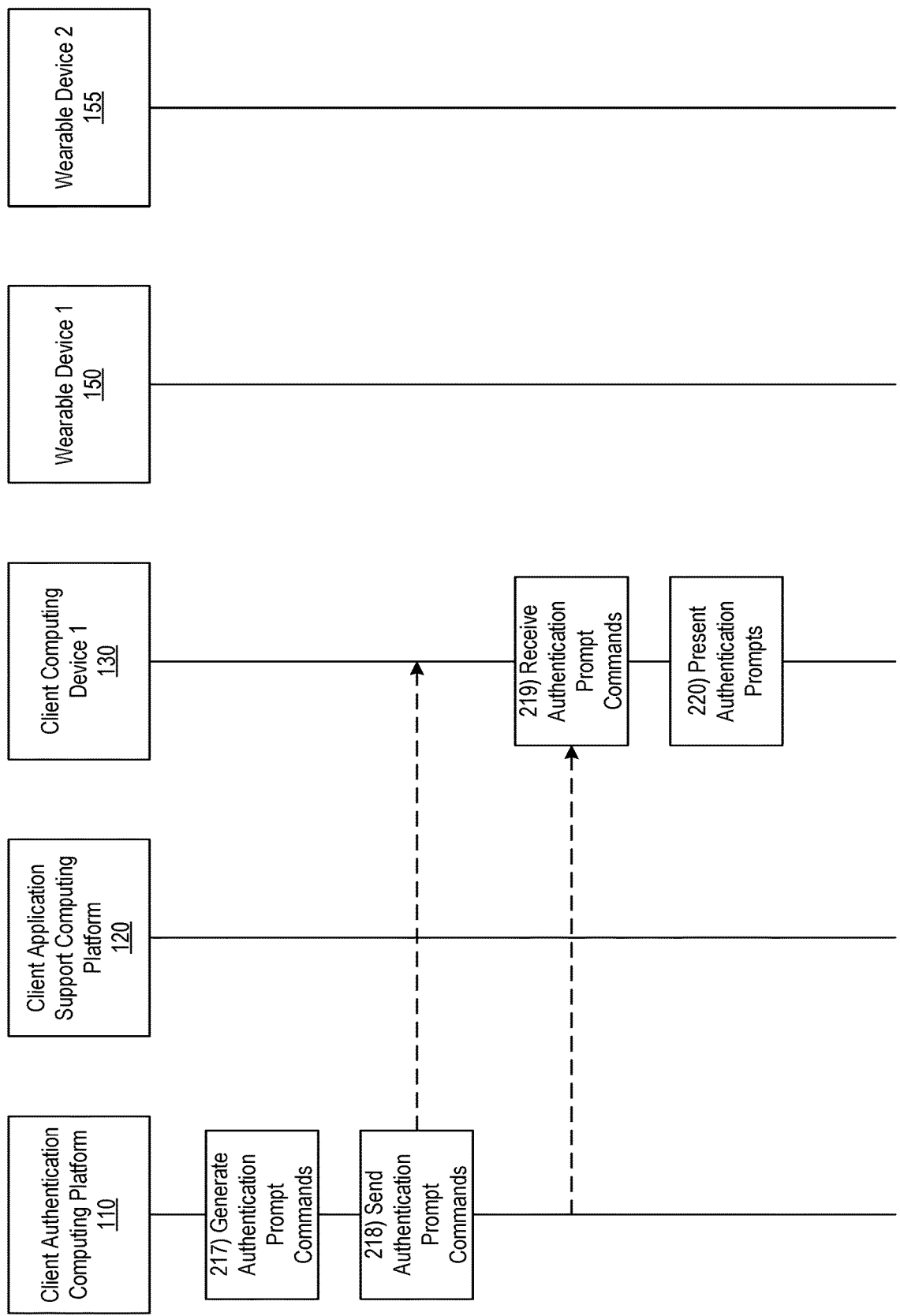

Referring to FIG. 2E, at step 217, client authentication computing platform 110 may generate one or more authentication prompt commands based on the user account state information corresponding to the user account associated with the mobile banking application installed on the computing device (e.g., client computing device 130). At step 218, client authentication computing platform 110 may send the one or more authentication prompt commands to the computing device (e.g., client computing device 130). At step 219, client computing device 130 may receive the one or more authentication prompt commands from client authentication computing platform 110. For example, at step 219, client computing device 130 may receive, via the communication interface, from the client authentication computing platform (e.g., client authentication computing platform 110), one or more authentication prompt commands.

Figure 4:
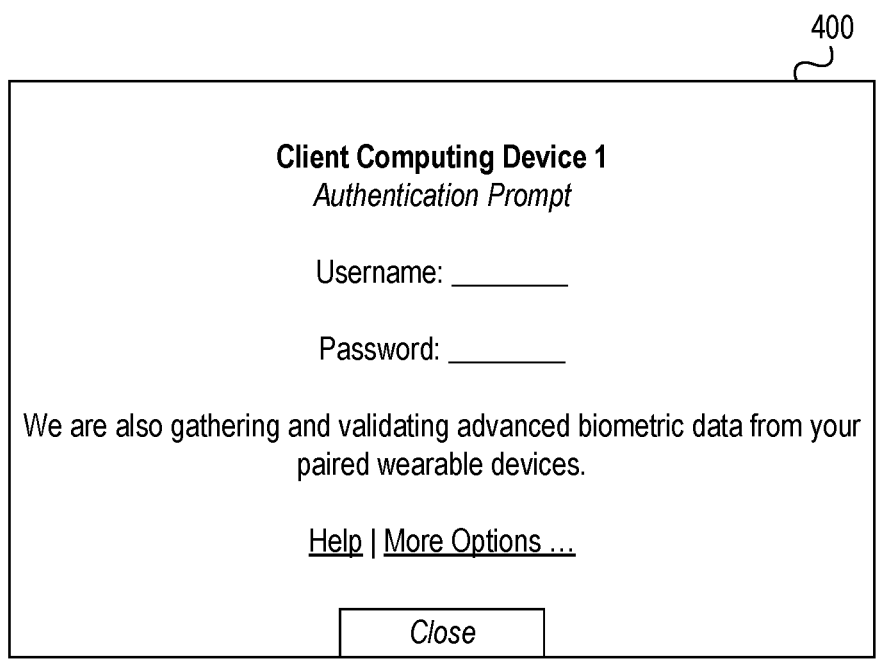

At step 220, client computing device 130 may present one or more authentication prompts based on the authentication prompt commands received from client authentication computing platform 110, and such authentication prompts may prompt the user of client computing device 130 to enter a username, password, one-time passcode, and/or one or more other authenticators. For example, at step 220, client computing device 130 may present one or more authentication prompts based on the one or more authentication prompt commands received from the client authentication computing platform (e.g., client authentication computing platform 110). In some instances, in presenting the one or more authentication prompts based on the one or more authentication prompt commands received from client authentication computing platform 110, client computing device 130 may display and/or otherwise present a graphical user interface similar to graphical user interface 400, which is illustrated in FIG. 4. As seen in FIG. 4, graphical user interface 400 may include one or more fields prompting the user of client computing device 130 to enter a username and a password associated with an online banking account or other user profile, information indicating that client computing device 130 is also collecting and verifying biometric data from linked wearable devices, and/or other user-selectable options and/or content.

Figure 2F:
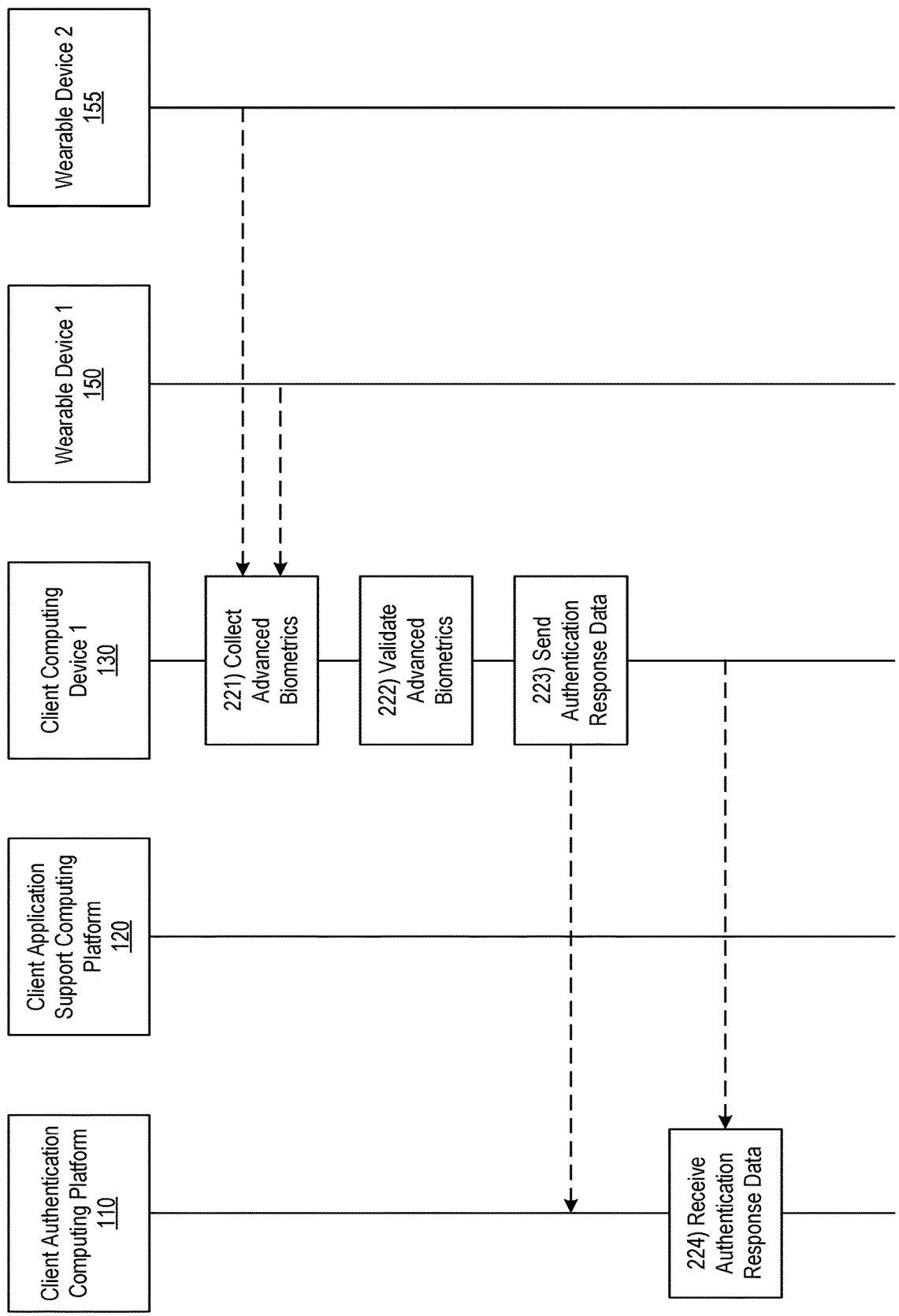

Referring to FIG. 2F, at step 221, client computing device 130 may collect advanced biometrics based on the authentication prompt commands (e.g., by connecting to and receiving biometric data from the linked wearable devices, e.g., wearable device 150 and wearable device 155). For example, at step 221, client computing device 130 may collect, from one or more linked wearable devices (e.g., wearable device 150, wearable device 155), one or more advanced biometrics based on the one or more authentication prompt commands received from the client authentication computing platform (e.g., client authentication computing platform 110). Such advanced biometrics may, for instance, include data uniquely identifying the heart rate of a user wearing a wearable device (e.g., wearable device 150, wearable device 155), the walking gait of a user wearing a wearable device (e.g., wearable device 150, wearable device 155), the blood pressure of a user wearing a wearable device (e.g., wearable device 150, wearable device 155), and/or other biometrics of a user wearing a wearable device (e.g., wearable device 150, wearable device 155) including other passive biometrics collected by such a wearable device over a relatively long period of time.

At step 222, client computing device 130 may validate the collected biometrics (e.g., to determine whether and/or confirm that the collected biometrics are valid). For example, at step 222, client computing device 130 may validate the one or more advanced biometrics collected from the one or more linked wearable devices (e.g., wearable device 150, wearable device 155) based on the one or more baseline data patterns (which may, e.g., have been previously generated and stored by client computing device 130, as discussed above). If the one or more advanced biometrics collected from the one or more linked wearable devices (e.g., wearable device 150, wearable device 155) are valid, the example event sequence may continue as illustrated; if the one or more advanced biometrics collected from the one or more linked wearable devices (e.g., wearable device 150, wearable device 155) are not valid, client computing device 130 may generate, display, and/or send one or more error messages, and the example event sequence may end.

At step 223, client computing device 130 may send authentication response data to client authentication computing platform 110, and such authentication response data may include username input, password input, one-time passcode input, and/or other input (which may, e.g., have been received by client computing device 130 in response to the one or more authentication prompts), as well as raw biometric data and/or validation data indicating that captured biometric data was locally validated on client computing device 130 by client computing device 130. For example, at step 223, based on validating the one or more advanced biometrics collected from the one or more linked wearable devices (e.g., wearable device 150, wearable device 155) based on the one or more baseline data patterns, client computing device 130 may send, via the communication interface, to the client authentication computing platform (e.g., client authentication computing platform 110), authentication response data.

In addition, sending the authentication response data to the client authentication computing platform may cause the client authentication computing platform to: validate the authentication response data; and based on validating the authentication response data, connect the computing device to a client application support computing platform configured to generate content for the mobile banking application installed on the computing device. For example, in sending the authentication response data to the client authentication computing platform (e.g., client authentication computing platform 110), client computing device 130 may cause the client authentication computing platform (e.g., client authentication computing platform 110) to validate the authentication response data. In addition, client computing device 130 may cause the client authentication computing platform (e.g., client authentication computing platform 110) to, based on validating the authentication response data, connect the computing device (e.g., client computing device 130) to a client application support computing platform (e.g., client application support computing platform 120) configured to generate content for the mobile banking application installed on the computing device (e.g., client computing device 130), as illustrated in greater detail below.

Figure 2G:
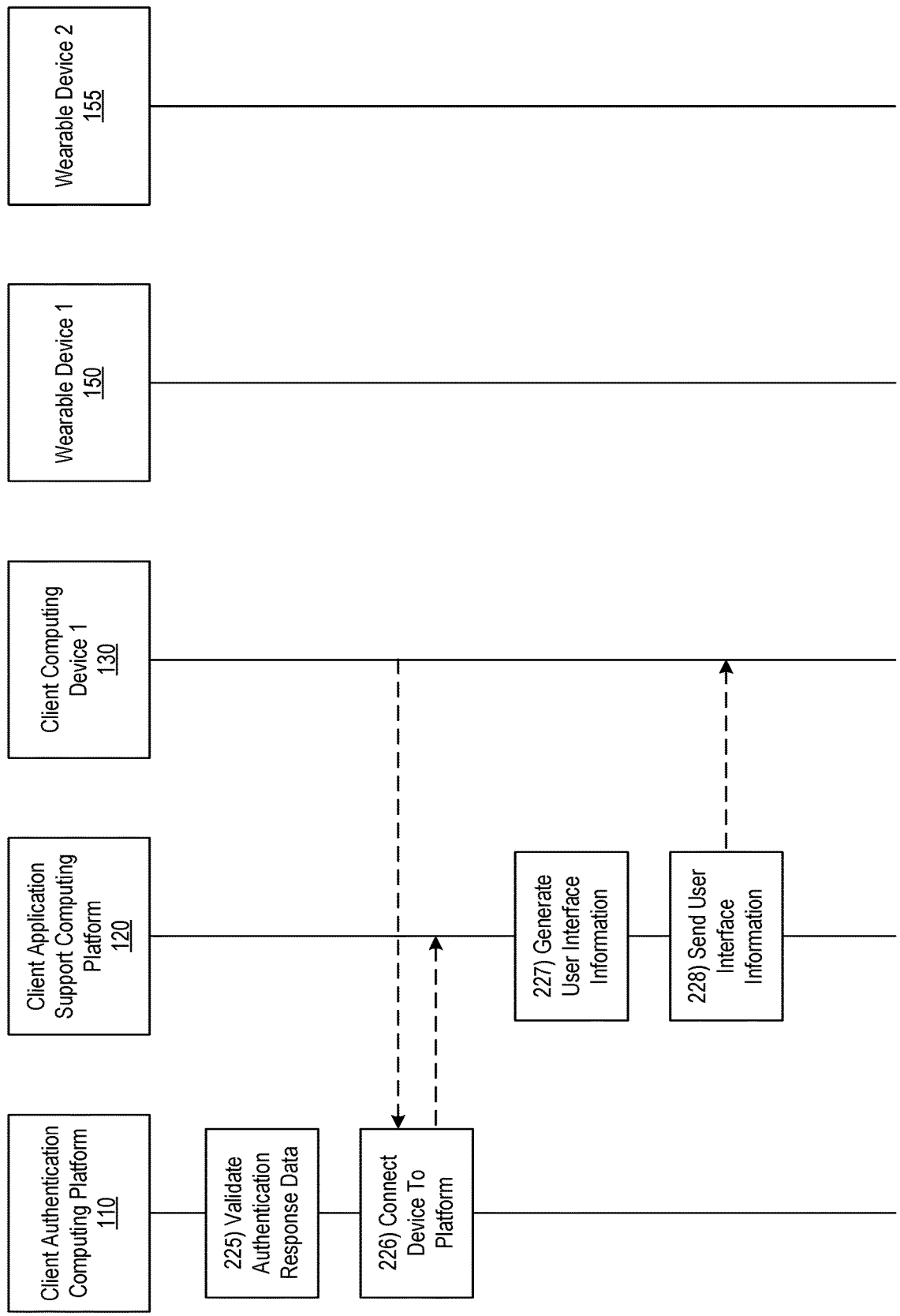

At step 224, client authentication computing platform 110 may receive the authentication response data from client computing device 130. Referring to FIG. 2G, at step 225, client authentication computing platform 110 may validate the authentication response data received from client computing device 130. At step 226, client authentication computing platform 110 may connect client computing device 130 to client application support computing platform 120 (e.g., based on validating the authentication response data received from client computing device 130). At step 227, client application support computing platform 120 may generate mobile banking user interface information (which may, e.g., include user interface templates, user interface layouts, user interface content data, and/or other information). At step 228, client application support computing platform 120 may send the mobile banking user interface information to client computing device 130.

Figure 5:
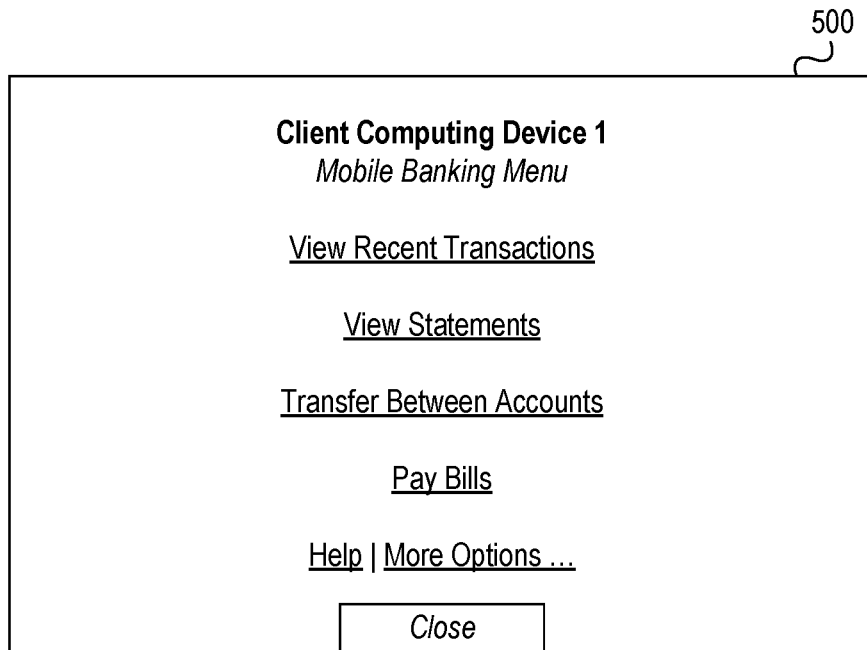

Referring to FIG. 2H, at step 229, client computing device 130 may receive the mobile banking user interface information generated by client application support computing platform 120 from client application support computing platform 120. For example, at step 229, after sending the authentication response data to the client authentication computing platform (e.g., client authentication computing platform 110), client computing device 130 may receive, from the client application support computing platform (e.g., client application support computing platform 120), mobile banking user interface information. At step 230, client computing device 130 may present one or more mobile banking user interfaces (e.g., based on the information received from client application support computing platform 120). For example, at step 230, client computing device 130 may present, using the mobile banking application installed on the computing device (e.g., client computing device 130), one or more mobile banking user interfaces based on the mobile banking user interface information received from the client application support computing platform (e.g., client application support computing platform 120). In some instances, in presenting the one or more mobile banking user interfaces based on the mobile banking user interface information received from the client application support computing platform (e.g., client application support computing platform 120), client computing device 130 may display and/or otherwise present a graphical user interface similar to graphical user interface 500, which is illustrated in FIG. 5. As seen in FIG. 5, graphical user interface 500 may include a mobile banking menu with various user-selectable options (which may, e.g., enable a user of client computing device 130 to view recent transactions, view account statements, transfer funds between accounts, pay electronic bills, or the like) and/or other user-selectable options and/or content.

At step 231, client computing device 130 may receive a request for a high-security transaction, such as a high-value transfer of funds, a transfer of funds to an external account, or the like, and a step-up authentication routine may be performed, as illustrated in greater detail below. For example, at step 231, client computing device 130 may receive input requesting a high-security transaction involving the user account associated with the mobile banking application installed on the computing device (e.g., client computing device 130). At step 232, client computing device 130 may send an authentication request to client authentication computing platform 110. For example, at step 232, based on receiving the input requesting the high-security transaction involving the user account associated with the mobile banking application installed on the computing device (e.g., client computing device 130), client computing device 130 may send, via the communication interface, to the client authentication computing platform (e.g., client authentication computing platform 110), a second authentication request.

Referring to FIG. 2I, at step 233, client authentication computing platform 110 may determine updated user account state information corresponding to the user account associated with the mobile banking application installed on the computing device (e.g., client computing device 130). For example, client authentication computing platform 110 may determine an updated security state of the user account associated with the mobile banking application installed on the computing device (e.g., client computing device 130) based on multi-channel authentication state information corresponding the user account and/or one or more authentication rules maintained by client authentication computing platform 110. At step 234, client authentication computing platform 110 may generate one or more step-up authentication prompt commands (e.g., based on the updated user account state information determined by client authentication computing platform 110). At step 235, client authentication computing platform 110 may send the one or more step-up authentication prompt commands to client computing device 130. At step 236, client authentication computing platform 110 may receive the one or more step-up authentication prompt commands from client authentication computing platform 110. For example, at step 236, after sending the second authentication request to the client authentication computing platform (e.g., client authentication computing platform 110), client computing device 130 may receive, via the communication interface, from the client authentication computing platform (e.g., client authentication computing platform 110), one or more step-up authentication prompt commands.

Figure 6:
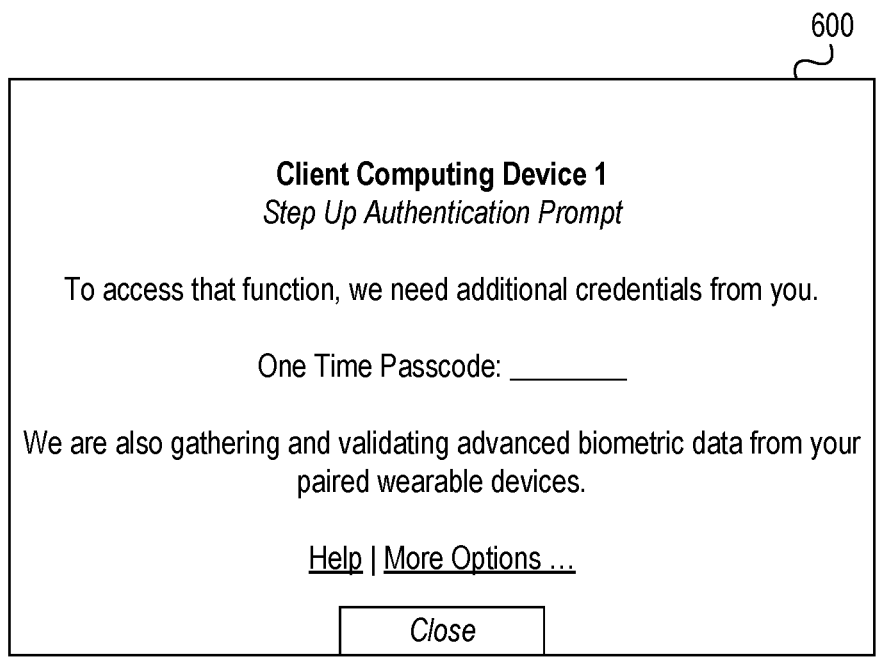

Referring to FIG. 2J, at step 237, client computing device 130 may present one or more step-up authentication prompts. For example, at step 237, client computing device 130 may present one or more step-up authentication prompts based on the one or more step-up authentication prompt commands received from the client authentication computing platform (e.g., client authentication computing platform 110). In some instances, in presenting the one or more step-up authentication prompts based on the one or more step-up authentication prompt commands received from the client authentication computing platform (e.g., client authentication computing platform 110), client computing device 130 may display and/or otherwise present a graphical user interface similar to graphical user interface 600, which is illustrated in FIG. 6. As seen in FIG. 6, graphical user interface 600 may include one or more fields prompting the user of client computing device 130 to enter additional credentials, such as a one-time passcode associated with an online banking account or other user profile, information indicating that client computing device 130 is also collecting and verifying biometric data from linked wearable devices, and/or other user-selectable options and/or content.

At step 238, client computing device 130 may collect advanced biometrics based on the step-up authentication prompt commands (e.g., by connecting to and receiving biometric data from the linked wearable devices, e.g., wearable device 150 and wearable device 155). For example, at step 238, client computing device 130 may collect, from the one or more linked wearable devices (e.g., wearable device 150, wearable device 155), one or more additional advanced biometrics based on the one or more step-up authentication prompt commands received from the client authentication computing platform (e.g., client authentication computing platform 110). Such advanced biometrics may, for instance, include data uniquely identifying the heart rate of a user wearing a wearable device (e.g., wearable device 150, wearable device 155), the walking gait of a user wearing a wearable device (e.g., wearable device 150, wearable device 155), the blood pressure of a user wearing a wearable device (e.g., wearable device 150, wearable device 155), and/or other biometrics of a user wearing a wearable device (e.g., wearable device 150, wearable device 155) including other passive biometrics collected by such a wearable device over a relatively long period of time and/or during a period of time since the advanced biometrics were collected in connection with the first authentication request.

At step 239, client computing device 130 may validate the collected biometrics (e.g., to determine whether and/or confirm that the collected biometrics are valid). For example, at step 239, client computing device 130 may validate the one or more additional advanced biometrics collected from the one or more linked wearable devices (e.g., wearable device 150, wearable device 155) based on the one or more baseline data patterns (which may, e.g., have been previously generated and stored by client computing device 130, as discussed above). If the one or more additional advanced biometrics collected from the one or more linked wearable devices (e.g., wearable device 150, wearable device 155) are valid, the example event sequence may continue as illustrated; if the one or more additional advanced biometrics collected from the one or more linked wearable devices (e.g., wearable device 150, wearable device 155) are not valid, client computing device 130 may generate, display, and/or send one or more error messages, and the example event sequence may end.

At step 240, client computing device 130 may send step-up authentication response data to client authentication computing platform 110, and such step-up authentication response data may include username input, password input, one-time passcode input, and/or other input (which may, e.g., have been received by client computing device 130 in response to the one or more step-up authentication prompts), as well as raw biometric data and/or validation data indicating that the additional captured biometric data was locally validated on client computing device 130 by client computing device 130. For example, at step 240, based on validating the one or more additional advanced biometrics collected from the one or more linked wearable devices (e.g., wearable device 150, wearable device 155) based on the one or more baseline data patterns, client computing device 130 may send, via the communication interface, to the client authentication computing platform (e.g., client authentication computing platform 110), step-up authentication response data.

In addition, sending the step-up authentication response data to the client authentication computing platform may cause the client authentication computing platform to: validate the step-up authentication response data; and based on validating the step-up authentication response data, send one or more validation commands to the client application support computing platform to trigger the client application support computing platform to generate high-security content for the mobile banking application installed on the computing device. For example, in sending the step-up authentication response data to the client authentication computing platform (e.g., client authentication computing platform 110), client computing device 130 may cause the client authentication computing platform (e.g., client authentication computing platform 110) to validate the step-up authentication response data. In addition, client computing device 130 may cause the client authentication computing platform (e.g., client authentication computing platform 110) to, based on validating the step-up authentication response data, send one or more validation commands to the client application support computing platform (e.g., client application support computing platform 120) to trigger the client application support computing platform (e.g., client application support computing platform 120) to generate high-security content for the mobile banking application installed on the computing device (e.g., client computing device 130), as illustrated in greater detail below.

Referring to FIG. 2K, client authentication computing platform 110 may receive the step-up authentication response data from client computing device 130. At step 242, client authentication computing platform 110 may validate the step-up authentication response data received from client computing device 130. At step 243, client authentication computing platform 110 may send one or more validation commands to client application support computing platform 120 (e.g., based on validating the step-up authentication response data received from client computing device 130) to trigger client application support computing platform 120 to provide client computing device 130 with access to one or more high-security interfaces and/or other high-security information. At step 244, client application support computing platform 120 may generate high-security mobile banking user interface information (which may, e.g., include high-security user interface templates, high-security user interface layouts, high-security user interface content data, and/or other information).

Figure 2L:
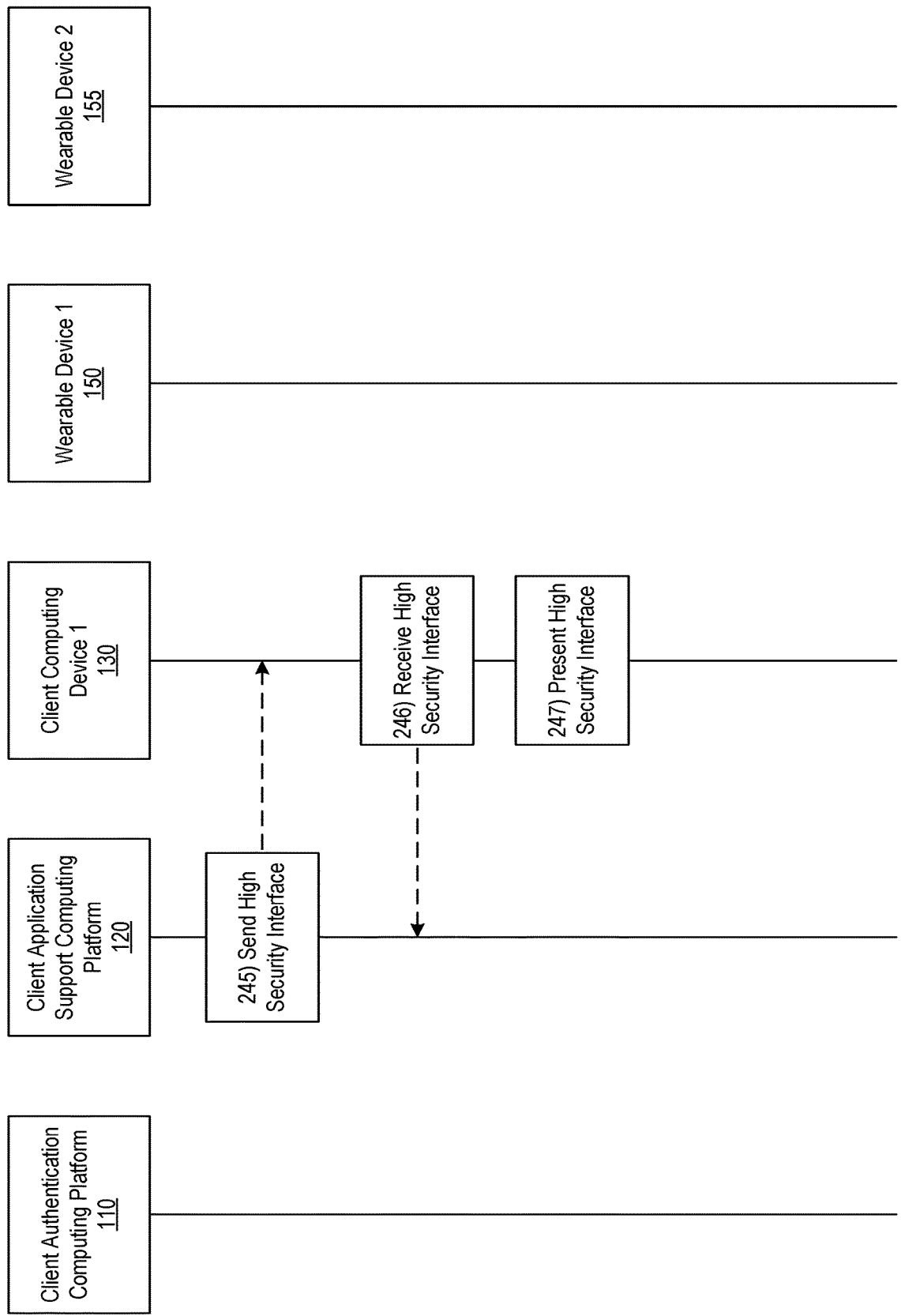

Referring to FIG. 2L, at step 245, client application support computing platform 120 may send the high-security mobile banking user interface information to client computing device 130. At step 246, client computing device 130 may receive the high-security mobile banking user interface information from client application support computing platform 120. For example, at step 246, client computing device 130 may receive, via the communication interface, from the client application support computing platform (e.g., client application support computing platform 120), high-security mobile banking user interface information. At step 247, client computing device 130 may present one or more high-security mobile banking user interfaces (e.g., based on the high-security information received from client application support computing platform 120). For example, at step 247, client computing device 130 may present, using the mobile banking application installed on the computing device (e.g., client computing device 130), one or more high-security mobile banking user interfaces based on the high-security mobile banking user interface information received from the client application support computing platform (e.g., client application support computing platform 120).

In some instances, after completing the step-up authentication routine described above, a user of client computing device 130 may be able to access and/or utilize additional functions with the mobile banking application installed on the computing device (e.g., client computing device 130). For example, after completing the step-up authentication routine described above, a user of client computing device 130 may be able to use the mobile banking application to request and/or perform a high-value transfer of funds, request and/or perform a transfer of funds to an external account, apply a digital signature to one or more electronic documents and/or otherwise electronically sign one or more documents (e.g., such as electronic home loan documents), navigate a virtual banking center user interface (which may, e.g., be presented on a wall panel display at a fully-automated and/or unstaffed banking center), and/or perform other functions.

In some instances, advanced biometric authentication techniques similar to those discussed above may be extended to and/or otherwise applied to other authentication use cases beyond the mobile banking use cases discussed in the examples above. For example, some of the features discussed above may be extended to and/or otherwise applied to authentication prompts presented when logging into an email provider user account, cloud service provider user account, social media user account, and/or other types of user accounts. In some instances, validation data associated with advanced biometrics may include a unique identifier linked to a particular user device and/or user of such a user device. In some instances, advanced biometrics may be collected from different wearable devices depending on a nature of a transaction being requested by a user of a user computing device (e.g., client computing device 130). For example, a user computing device may collect data from a smart refrigerator when authenticating a user for purposes of completing a food purchasing transaction, the user computing device may collect data from a smart watch when authenticating a user for purposes of completing a high-value funds transfer, and the user computing device may collect data from a premium token when authenticating a user for purposes of completing a wire transfer. Other configuration options may be implemented in other instances, and in some instances, data from multiple wearable devices may be required.

Figure 7:
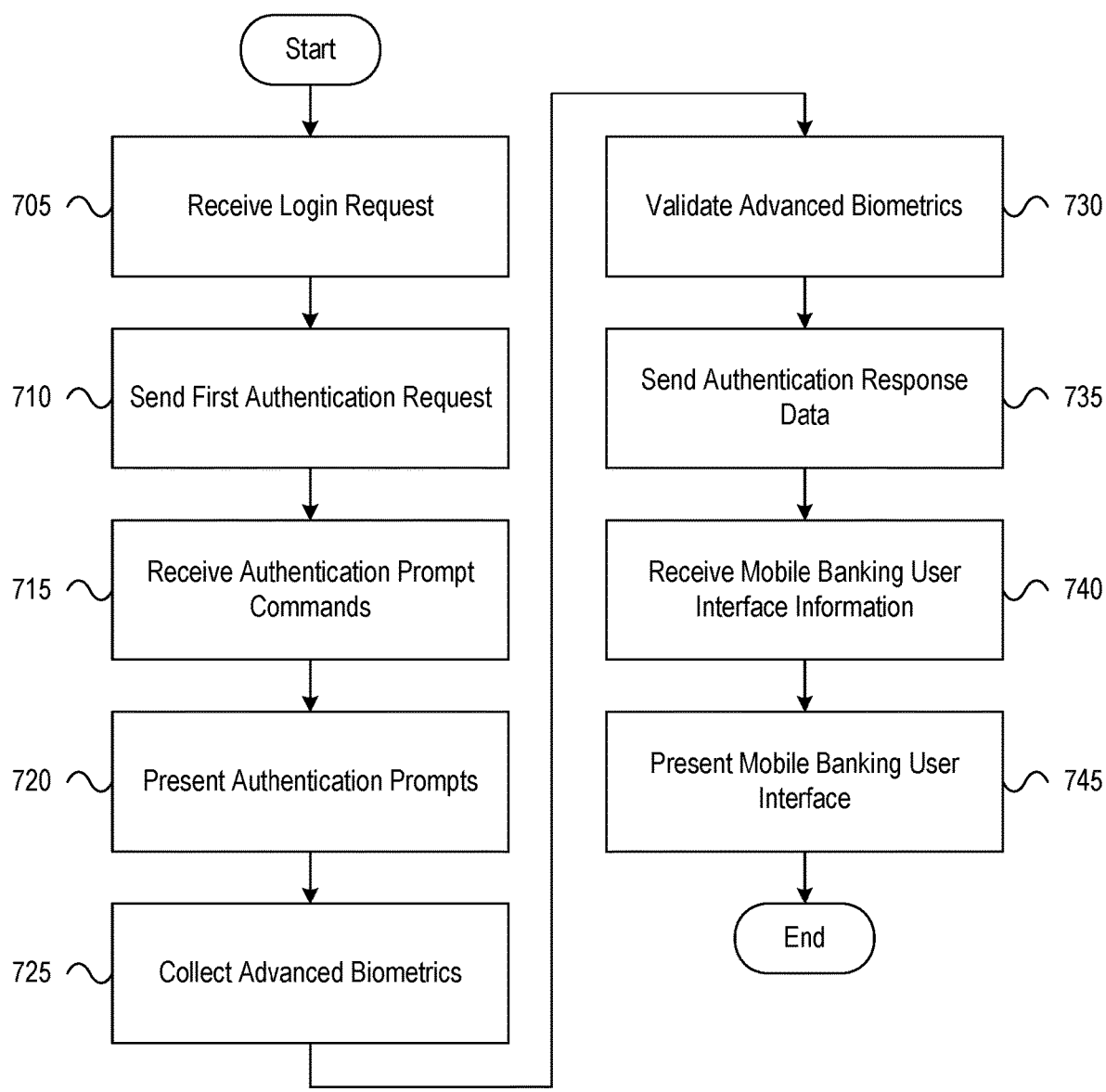
FIG. 7 depicts an illustrative method for preventing unauthorized access to secured information systems using advanced biometric authentication techniques in accordance with one or more example embodiments.

FIG. 7 depicts an illustrative method for preventing unauthorized access to secured information systems using advanced biometric authentication techniques in accordance with one or more example embodiments. Referring to FIG. 7, at step 705, a computing device having at least one processor, a communication interface, and memory may receive input requesting to login to a user account associated with a mobile banking application installed on the computing device. At step 710, based on receiving the input requesting to login to the user account associated with the mobile banking application installed on the computing device, the computing device may send, via the communication interface, to a client authentication computing platform, a first authentication request. At step 715, the computing device may receive, via the communication interface, from the client authentication computing platform, one or more authentication prompt commands. At step 720, the computing device may present one or more authentication prompts based on the one or more authentication prompt commands received from the client authentication computing platform. At step 725, the computing device may collect, from one or more linked wearable devices, one or more advanced biometrics based on the one or more authentication prompt commands received from the client authentication computing platform. At step 730, the computing device may validate the one or more advanced biometrics collected from the one or more linked wearable devices based on one or more baseline data patterns. At step 735, based on validating the one or more advanced biometrics collected from the one or more linked wearable devices based on the one or more baseline data patterns, the computing device may send, via the communication interface, to the client authentication computing platform, authentication response data. In addition, sending the authentication response data to the client authentication computing platform may cause the client authentication computing platform to: validate the authentication response data; and based on validating the authentication response data, connect the computing device to a client application support computing platform configured to generate content for the mobile banking application installed on the computing device. At step 740, after sending the authentication response data to the client authentication computing platform, the computing device may receive, from the client application support computing platform, mobile banking user interface information. At step 745, the computing device may present, using the mobile banking application installed on the computing device, one or more mobile banking user interfaces based on the mobile banking user interface information received from the client application support computing platform.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing device, comprising:
   at least one processor;
   a communication interface communicatively coupled to the at least one processor; and
   memory storing computer-readable instructions that, when executed by the at least one processor, cause the computing device to:
   receive input requesting to login to a user account associated with a mobile banking application installed on the computing device;
   based on receiving the input requesting to login to the user account associated with the mobile banking application installed on the computing device, send, via the communication interface, to a client authentication computing platform, a first authentication request;
   receive, via the communication interface, from the client authentication computing platform, one or more authentication prompt commands;
   present one or more authentication prompts based on the one or more authentication prompt commands received from the client authentication computing platform;
   collect, from one or more linked wearable devices, one or more advanced biometrics based on the one or more authentication prompt commands received from the client authentication computing platform;
   validate the one or more advanced biometrics collected from the one or more linked wearable devices based on one or more baseline data patterns;
   based on validating the one or more advanced biometrics collected from the one or more linked wearable devices based on the one or more baseline data patterns, send, via the communication interface, to the client authentication computing platform, authentication response data,
   wherein sending the authentication response data to the client authentication computing platform causes the client authentication computing platform to:
   validate the authentication response data; and
   based on validating the authentication response data, connect the computing device to a client application support computing platform configured to generate content for the mobile banking application installed on the computing device,
   after sending the authentication response data to the client authentication computing platform, receive, from the client application support computing platform, mobile banking user interface information;
   present, using the mobile banking application installed on the computing device, one or more mobile banking user interfaces based on the mobile banking user interface information received from the client application support computing platform;
   receive input requesting a high-security transaction involving the user account associated with the mobile banking application installed on the computing device;
   based on receiving the input requesting the high-security transaction involving the user account associated with the mobile banking application installed on the computing device, send, via the communication interface, to the client authentication computing platform, a second authentication request;
   after sending the second authentication request to the client authentication computing platform, receive, via the communication interface, from the client authentication computing platform, one or more step-up authentication prompt commands;
   present one or more step-up authentication prompts based on the one or more step-up authentication prompt commands received from the client authentication computing platform;
   collect, from the one or more linked wearable devices, one or more additional advanced biometrics based on the one or more step-up authentication prompt commands received from the client authentication computing platform;
   validate the one or more additional advanced biometrics collected from the one or more linked wearable devices based on the one or more baseline data patterns; and
   based on validating the one or more additional advanced biometrics collected from the one or more linked wearable devices based on the one or more baseline data patterns, send, via the communication interface, to the client authentication computing platform, step-up authentication response data.

2. The computing device of claim 1, wherein the memory stores additional computer-readable instructions that, when executed by the at least one processor, cause the computing device to:
   prior to receiving the input requesting to login to the user account associated with the mobile banking application installed on the computing device, receive, via the communication interface, from the client authentication computing platform, the mobile banking application,
wherein the mobile banking application received from the client authentication computing platform is configured by the client authentication computing platform for the computing device.

3. The computing device of claim 2, wherein the memory stores additional computer-readable instructions that, when executed by the at least one processor, cause the computing device to:
based on receiving the mobile banking application from the client authentication computing platform, launch the mobile banking application; and
based on launching the mobile banking application, present a device pairing user interface.

4. The computing device of claim 3, wherein the memory stores additional computer-readable instructions that, when executed by the at least one processor, cause the computing device to:
establish a first wireless data connection to a first wearable device of the one or more linked wearable devices to link the first wearable device to the computing device;
establish a second wireless data connection to a second wearable device of the one or more linked wearable devices to link the second wearable device to the computing device;
while the first wireless data connection is established, receive first biometric data from the first wearable device via the first wireless data connection; and
while the second wireless data connection is established, receive second biometric data from the second wearable device via the second wireless data connection.

5. The computing device of claim 4, wherein the memory stores additional computer-readable instructions that, when executed by the at least one processor, cause the computing device to:
generate a first baseline data pattern of the one or more baseline data patterns based on the first biometric data received from the first wearable device via the first wireless data connection;
generate a second baseline data pattern of the one or more baseline data patterns based on the second biometric data received from the second wearable device via the second wireless data connection;
store the first baseline data pattern of the one or more baseline data patterns for validating biometric data received from the first wearable device; and
store the second baseline data pattern of the one or more baseline data patterns for validating biometric data received from the second wearable device.

6. The computing device of claim 1, wherein sending the first authentication request to the client authentication computing platform causes the client authentication computing platform to:
determine user account state information corresponding to the user account associated with the mobile banking application installed on the computing device;
generate the one or more authentication prompt commands based on the user account state information corresponding to the user account associated with the mobile banking application installed on the computing device; and
send the one or more authentication prompt commands to the computing device.

7. The computing device of claim 1, wherein sending the step-up authentication response data to the client authentication computing platform causes the client authentication computing platform to:
validate the step-up authentication response data; and
based on validating the step-up authentication response data, send one or more validation commands to the client application support computing platform to trigger the client application support computing platform to generate high-security content for the mobile banking application installed on the computing device.

8. The computing device of claim 7, wherein the memory stores additional computer-readable instructions that, when executed by the at least one processor, cause the computing device to:
receive, from the client application support computing platform, high-security mobile banking user interface information; and
present, using the mobile banking application installed on the computing device, one or more high-security mobile banking user interfaces based on the high-security mobile banking user interface information received from the client application support computing platform.

9. A method, comprising:
at a computing device comprising at least one processor, a communication interface, and memory:
receiving, by the at least one processor, input requesting to login to a user account associated with a mobile banking application installed on the computing device;
based on receiving the input requesting to login to the user account associated with the mobile banking application installed on the computing device, sending, by the at least one processor, via the communication interface, to a client authentication computing platform, a first authentication request;
receiving, by the at least one processor, via the communication interface, from the client authentication computing platform, one or more authentication prompt commands;
presenting, by the at least one processor, one or more authentication prompts based on the one or more authentication prompt commands received from the client authentication computing platform;
collecting, by the at least one processor, from one or more linked wearable devices, one or more advanced biometrics based on the one or more authentication prompt commands received from the client authentication computing platform;
validating, by the at least one processor, the one or more advanced biometrics collected from the one or more linked wearable devices based on one or more baseline data patterns;
based on validating the one or more advanced biometrics collected from the one or more linked wearable devices based on the one or more baseline data patterns, sending, by the at least one processor, via the communication interface, to the client authentication computing platform, authentication response data,
wherein sending the authentication response data to the client authentication computing platform causes the client authentication computing platform to:
  validate the authentication response data; and
  based on validating the authentication response data, connect the computing device to a client application support computing platform configured to generate content for the mobile banking application installed on the computing device,
after sending the authentication response data to the client authentication computing platform, receiving, by the at least one processor, from the client application support computing platform, mobile banking user interface information;
presenting, by the at least one processor, using the mobile banking application installed on the computing device, one or more mobile banking user interfaces based on the mobile banking user interface information received from the client application support computing platform;
receiving, by the at least one processor, input requesting a high-security transaction involving the user account associated with the mobile banking application installed on the computing device;
based on receiving the input requesting the high-security transaction involving the user account associated with the mobile banking application installed on the computing device, sending, by the at least one processor, via the communication interface, to the client authentication computing platform, a second authentication request;
after sending the second authentication request to the client authentication computing platform, receiving, by the at least one processor, via the communication interface, from the client authentication computing platform, one or more step-up authentication prompt commands;
presenting, by the at least one processor, one or more step-up authentication prompts based on the one or more step-up authentication prompt commands received from the client authentication computing platform;
collecting, by the at least one processor, from the one or more linked wearable devices, one or more additional advanced biometrics based on the one or more step-up authentication prompt commands received from the client authentication computing platform;
validating, by the at least one processor, the one or more additional advanced biometrics collected from the one or more linked wearable devices based on the one or more baseline data patterns; and
based on validating the one or more additional advanced biometrics collected from the one or more linked wearable devices based on the one or more baseline data patterns, sending, by the at least one processor, via the communication interface, to the client authentication computing platform, step-up authentication response data.

10. The method of claim 9, comprising:
prior to receiving the input requesting to login to the user account associated with the mobile banking application installed on the computing device, receiving, by the at least one processor, via the communication interface, from the client authentication computing platform, the mobile banking application,
wherein the mobile banking application received from the client authentication computing platform is configured by the client authentication computing platform for the computing device.

11. The method of claim 10, comprising:
based on receiving the mobile banking application from the client authentication computing platform, launching, by the at least one processor, the mobile banking application; and
based on launching the mobile banking application, presenting, by the at least one processor, a device pairing user interface.

12. The method of claim 11, comprising:
establishing, by the at least one processor, a first wireless data connection to a first wearable device of the one or more linked wearable devices to link the first wearable device to the computing device;
establishing, by the at least one processor, a second wireless data connection to a second wearable device of the one or more linked wearable devices to link the second wearable device to the computing device;
while the first wireless data connection is established, receiving, by the at least one processor, first biometric data from the first wearable device via the first wireless data connection; and
while the second wireless data connection is established, receiving, by the at least one processor, second biometric data from the second wearable device via the second wireless data connection.

13. The method of claim 12, comprising:
generating, by the at least one processor, a first baseline data pattern of the one or more baseline data patterns based on the first biometric data received from the first wearable device via the first wireless data connection;
generating, by the at least one processor, a second baseline data pattern of the one or more baseline data patterns based on the second biometric data received from the second wearable device via the second wireless data connection;
storing, by the at least one processor, the first baseline data pattern of the one or more baseline data patterns for validating biometric data received from the first wearable device; and
storing, by the at least one processor, the second baseline data pattern of the one or more baseline data patterns for validating biometric data received from the second wearable device.

14. The method of claim 9, wherein sending the first authentication request to the client authentication computing platform causes the client authentication computing platform to:
determine user account state information corresponding to the user account associated with the mobile banking application installed on the computing device;
generate the one or more authentication prompt commands based on the user account state information corresponding to the user account associated with the mobile banking application installed on the computing device; and
send the one or more authentication prompt commands to the computing device.

15. The method of claim 9, wherein sending the step-up authentication response data to the client authentication computing platform causes the client authentication computing platform to:

validate the step-up authentication response data; and
based on validating the step-up authentication response data, send one or more validation commands to the client application support computing platform to trigger the client application support computing platform to generate high-security content for the mobile banking application installed on the computing device.

16. One or more non-transitory computer-readable media storing instructions that, when executed by a computing device comprising at least one processor, a communication interface, and memory, cause the computing device to:
receive input requesting to login to a user account associated with a mobile banking application installed on the computing device;
based on receiving the input requesting to login to the user account associated with the mobile banking application installed on the computing device, send, via the communication interface, to a client authentication computing platform, a first authentication request;
receive, via the communication interface, from the client authentication computing platform, one or more authentication prompt commands;
present one or more authentication prompts based on the one or more authentication prompt commands received from the client authentication computing platform;
collect, from one or more linked wearable devices, one or more advanced biometrics based on the one or more authentication prompt commands received from the client authentication computing platform;
validate the one or more advanced biometrics collected from the one or more linked wearable devices based on one or more baseline data patterns;
based on validating the one or more advanced biometrics collected from the one or more linked wearable devices based on the one or more baseline data patterns, send, via the communication interface, to the client authentication computing platform, authentication response data,
wherein sending the authentication response data to the client authentication computing platform causes the client authentication computing platform to:
validate the authentication response data; and
based on validating the authentication response data, connect the computing device to a client application support computing platform configured to generate content for the mobile banking application installed on the computing device,
after sending the authentication response data to the client authentication computing platform, receive, from the client application support computing platform, mobile banking user interface information;
present, using the mobile banking application installed on the computing device, one or more mobile banking user interfaces based on the mobile banking user interface information received from the client application support computing platform;
receive input requesting a high-security transaction involving the user account associated with the mobile banking application installed on the computing device;
based on receiving the input requesting the high-security transaction involving the user account associated with the mobile banking application installed on the computing device, send, via the communication interface, to the client authentication computing platform, a second authentication request;
after sending the second authentication request to the client authentication computing platform, receive, via the communication interface, from the client authentication computing platform, one or more step-up authentication prompt commands;
present one or more step-up authentication prompts based on the one or more step-up authentication prompt commands received from the client authentication computing platform;
collect, from the one or more linked wearable devices, one or more additional advanced biometrics based on the one or more step-up authentication prompt commands received from the client authentication computing platform;
validate the one or more additional advanced biometrics collected from the one or more linked wearable devices based on the one or more baseline data patterns; and
based on validating the one or more additional advanced biometrics collected from the one or more linked wearable devices based on the one or more baseline data patterns, send, via the communication interface, to the client authentication computing platform, step-up authentication response data.

17. The one or more non-transitory computer-readable media of claim 16, storing additional instructions that, when executed by the computing device, cause the computing device to:
prior to receiving the input requesting to login to the user account associated with the mobile banking application installed on the computing device, receive, via the communication interface, from the client authentication computing platform, the mobile banking application,
wherein the mobile banking application received from the client authentication computing platform is configured by the client authentication computing platform for the computing device.

18. The one or more non-transitory computer-readable media of claim 17, storing additional instructions that, when executed by the computing device, cause the computing device to:
based on receiving the mobile banking application from the client authentication computing platform, launch the mobile banking application; and
based on launching the mobile banking application, present a device pairing user interface.

19. The one or more non-transitory computer-readable media of claim 18, storing additional instructions that, when executed by the computing device, cause the computing device to:
establish a first wireless data connection to a first wearable device of the one or more linked wearable devices to link the first wearable device to the computing device;
establish a second wireless data connection to a second wearable device of the one or more linked wearable devices to link the second wearable device to the computing device;
while the first wireless data connection is established, receive first biometric data from the first wearable device via the first wireless data connection; and
while the second wireless data connection is established, receive second biometric data from the second wearable device via the second wireless data connection.

20. The one or more non-transitory computer-readable media of claim 19, storing additional instructions that, when executed by the computing device, cause the computing device to:

generate a first baseline data pattern of the one or more baseline data patterns based on the first biometric data received from the first wearable device via the first wireless data connection;
generate a second baseline data pattern of the one or more baseline data patterns based on the second biometric data received from the second wearable device via the second wireless data connection;
store the first baseline data pattern of the one or more baseline data patterns for validating biometric data received from the first wearable device; and
store the second baseline data pattern of the one or more baseline data patterns for validating biometric data received from the second wearable device.

\* \* \* \* \*